United States Patent
Murata et al.

(10) Patent No.: US 11,543,648 B2
(45) Date of Patent: Jan. 3, 2023

(54) VIRTUAL IMAGE PROJECTION DEVICE

(71) Applicant: Hitachi-LG Data Storage, Inc., Tokyo (JP)

(72) Inventors: Seiji Murata, Tokyo (JP); Ryuji Ukai, Tokyo (JP); Tomoto Kawamura, Tokyo (JP); Toshiteru Nakamura, Tokyo (JP)

(73) Assignee: HITACHI-LG DATA STORAGE, INC., Tokyo (JP)

( * ) Notice: Subject to any disclaimer, the term of this patent is extended or adjusted under 35 U.S.C. 154(b) by 394 days.

(21) Appl. No.: 16/754,839

(22) PCT Filed: Oct. 30, 2018

(86) PCT No.: PCT/JP2018/040242
§ 371 (c)(1),
(2) Date: Apr. 9, 2020

(87) PCT Pub. No.: WO2019/107044
PCT Pub. Date: Jun. 6, 2019

(65) Prior Publication Data
US 2021/0149183 A1  May 20, 2021

(30) Foreign Application Priority Data
Dec. 1, 2017  (JP) .............................. JP2017-231373

(51) Int. Cl.
*G02B 25/00* (2006.01)
*G02B 13/18* (2006.01)
*H04N 9/31* (2006.01)

(52) U.S. Cl.
CPC ........... *G02B 25/001* (2013.01); *G02B 13/18* (2013.01); *H04N 9/315* (2013.01)

(58) Field of Classification Search
CPC .................. G02B 25/001; G02B 13/18; G02B 27/0172; G02B 27/02; G02B 3/00; H04N 9/315; H04N 5/64; H04N 9/3111; H04N 9/3141
See application file for complete search history.

(56) References Cited

U.S. PATENT DOCUMENTS 4,082,415 A * 4/1978 Brooks ..................... G02B 5/32
359/30
10,495,888 B2 * 12/2019 Yonekubo .......... G02B 27/0172
(Continued)

FOREIGN PATENT DOCUMENTS

| CN | 1328657 A | 12/2001 |
|---|---|---|
| CN | 101846799 A | 9/2010 |

(Continued)

OTHER PUBLICATIONS

Chinese Office Action received in corresponding Chinese Application No. 201880065774.9 dated Jul. 12, 2021.
(Continued)

*Primary Examiner* — Magda Cruz
(74) *Attorney, Agent, or Firm* — Mattingly & Malur, PC

(57) ABSTRACT

There is provided a highly efficient virtual image projection device in a small size that displays images of high luminance in which an illumination system is reduced in size with no degradation in an effective luminous light beam. A virtual image projection device that shows video to a human eye includes a virtual light source surface (116) that emits a light beam in a predetermined angular distribution, an image forming lens (117) that condenses the light beam from the virtual light source surface (116), and a display (120) that creates video. When the virtual light source surface (116) is disposed at a nearly focal position on the front side of the
(Continued)

image forming lens (117), the display (120) is disposed at a nearly focal position on the rear side of the image forming lens.

12 Claims, 16 Drawing Sheets

(56) References Cited

U.S. PATENT DOCUMENTS

| | | |
|---|---|---|
| 2002/0030773 A1 | 3/2002 | Endo et al. |
| 2004/0062044 A1 | 4/2004 | Hanano |
| 2007/0146655 A1* | 6/2007 | Li .............................. H04N 5/74 353/122 |
| 2008/0239424 A1 | 10/2008 | Mukawa et al. |
| 2012/0086623 A1* | 4/2012 | Takagi ................. G02B 6/0053 345/7 |
| 2012/0092626 A1* | 4/2012 | Chang .................. G03B 21/208 353/38 |
| 2014/0267636 A1 | 9/2014 | Takagi et al. |
| 2015/0153575 A1* | 6/2015 | Komatsu ............ G02B 27/0172 345/8 |
| 2015/0160460 A1* | 6/2015 | Komatsu ............ G02B 17/0856 359/629 |
| 2017/0280031 A1 | 9/2017 | Price et al. |

FOREIGN PATENT DOCUMENTS

| | | |
|---|---|---|
| JP | 2002-090694 A | 3/2002 |
| JP | 2004-102132 A | 4/2004 |
| JP | 2004-157173 A | 6/2004 |
| JP | 2008-287049 A | 11/2008 |
| JP | 2013-045649 A | 3/2013 |
| JP | 2014-174429 A | 9/2014 |
| JP | 2016-095411 A | 5/2016 |
| WO | 2005/093493 A1 | 10/2005 |
| WO | WO-2017169345 A1 * | 10/2017 ............ G02B 27/02 |

OTHER PUBLICATIONS

International Search Report of PCT/JP2018/040242 dated Jan. 22, 2019.

* cited by examiner

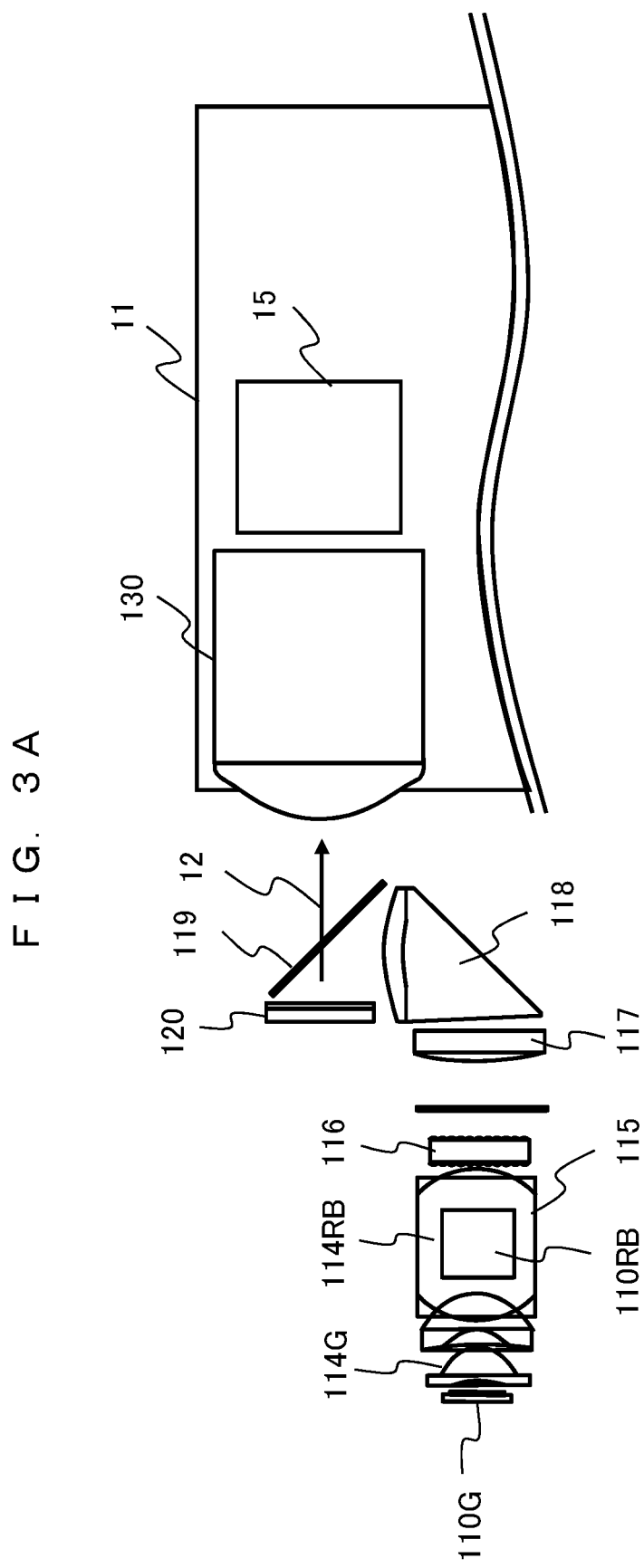

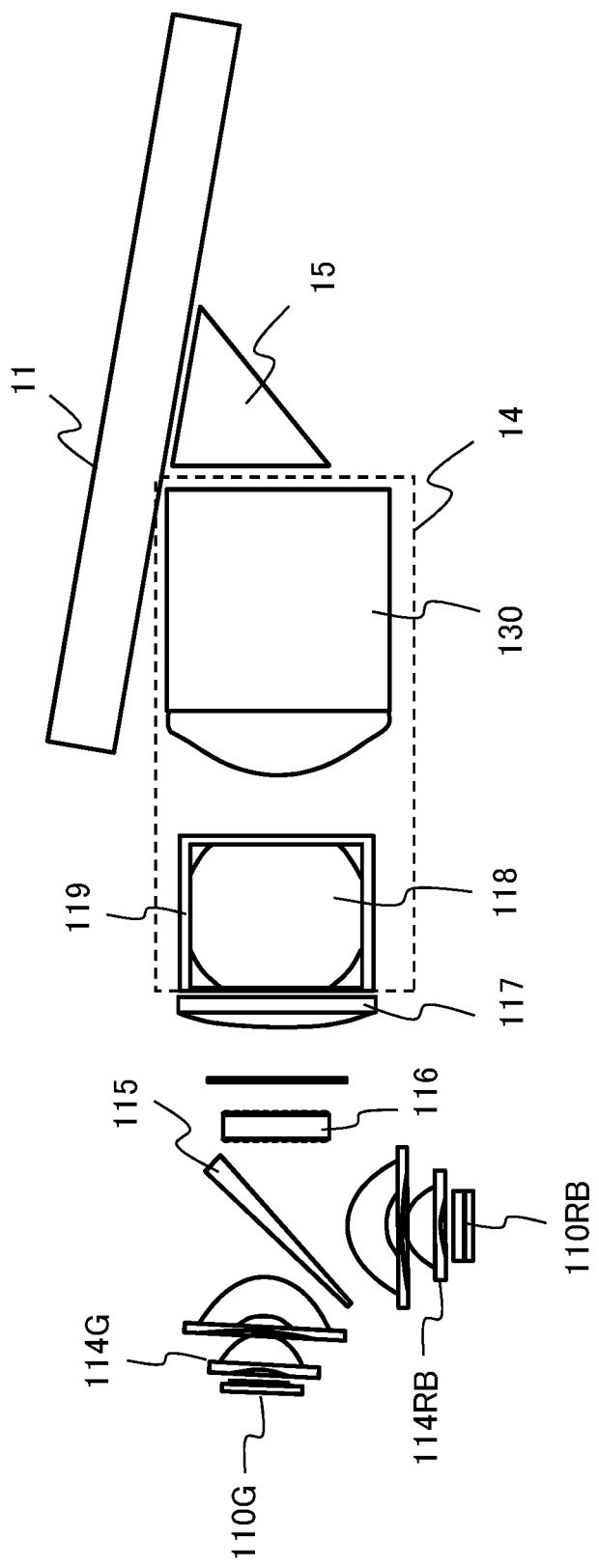

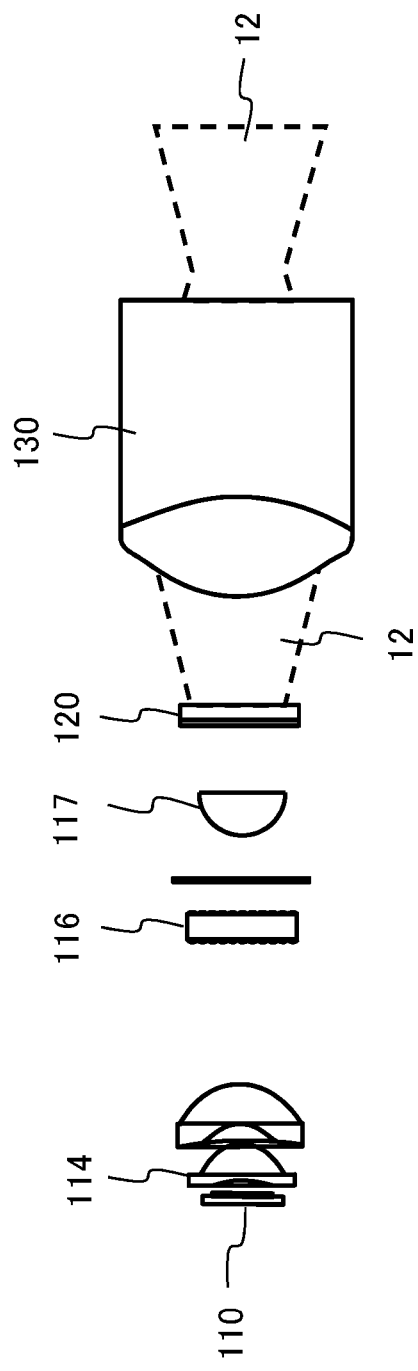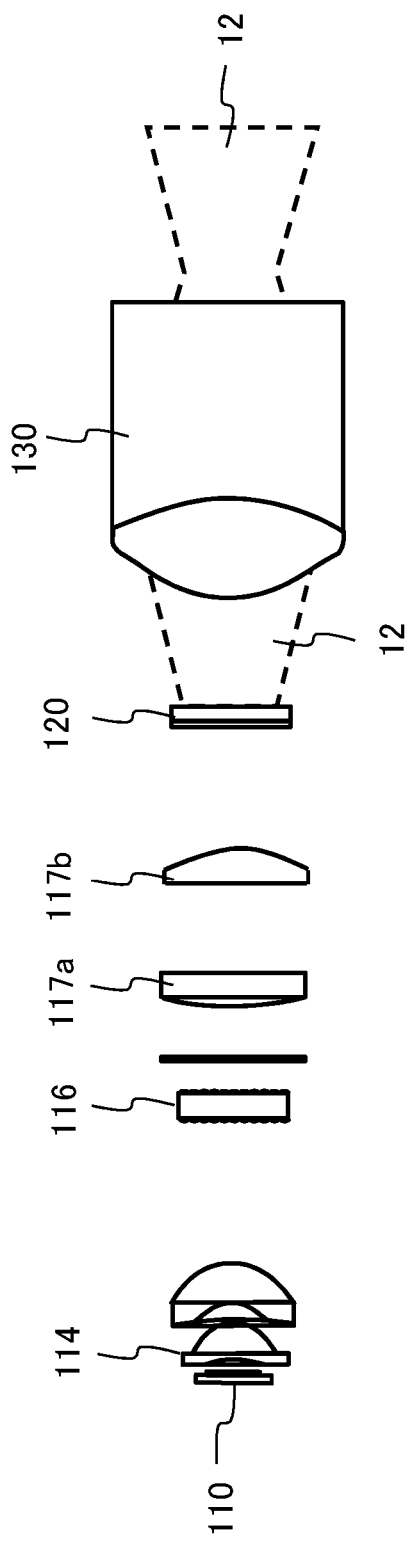

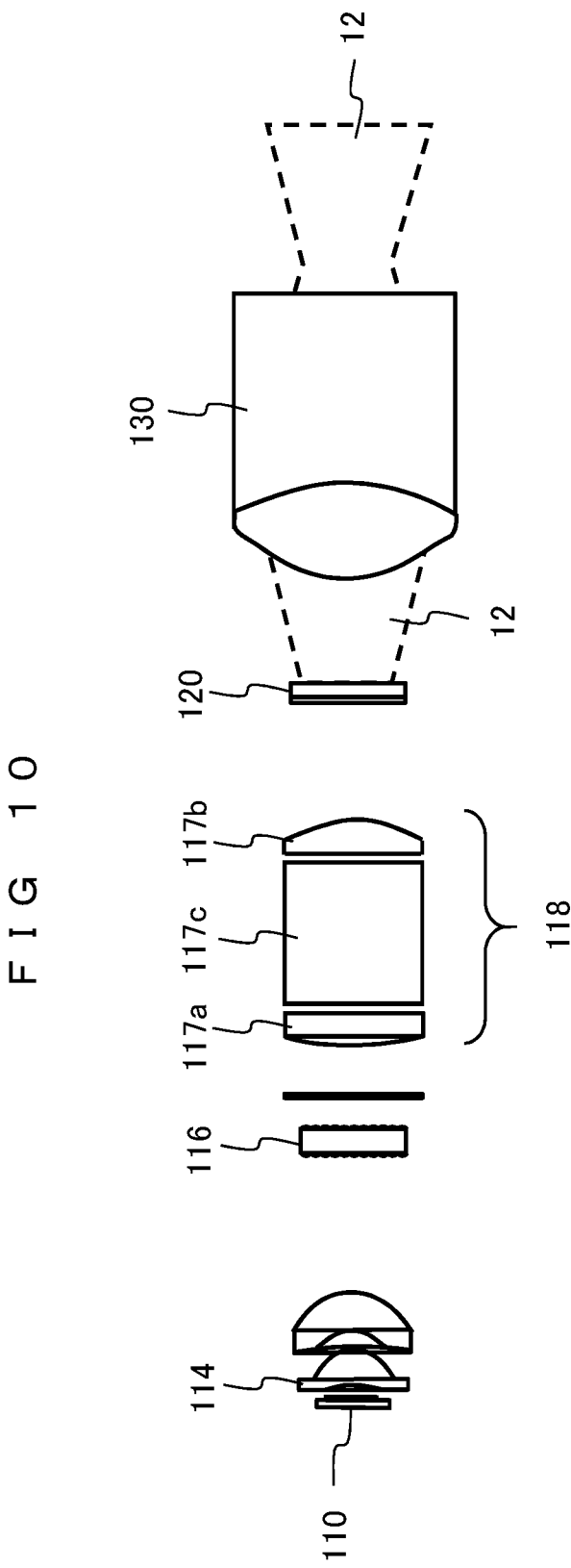

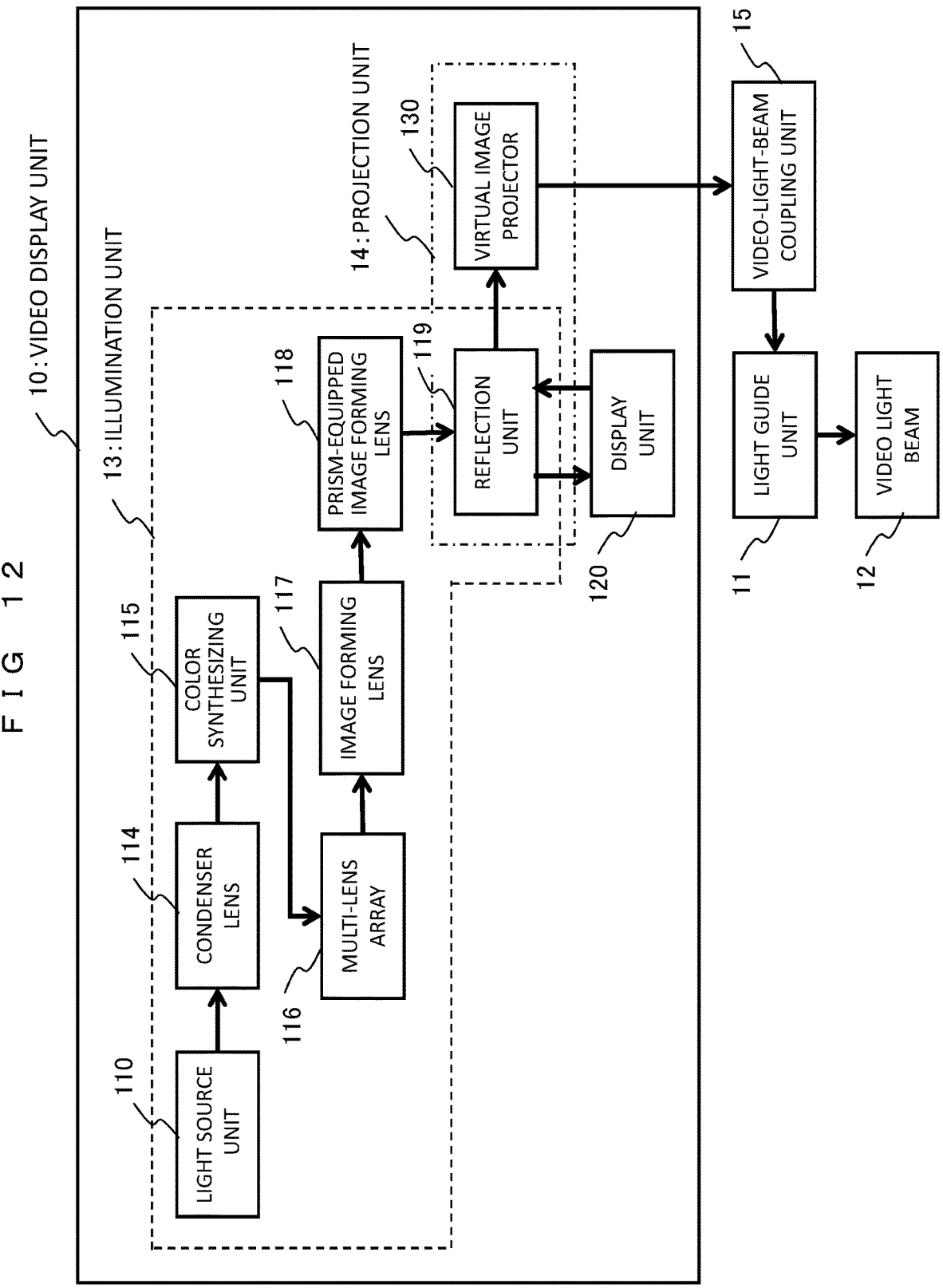

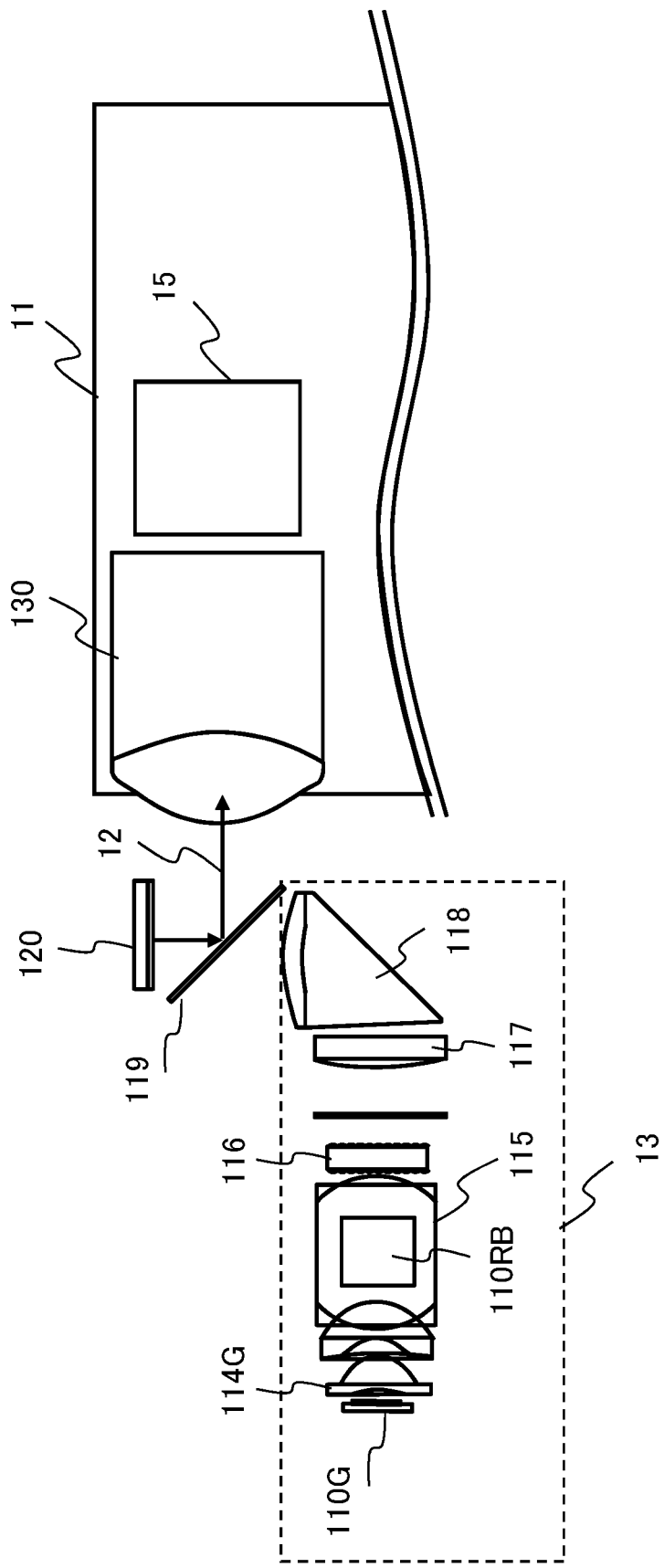

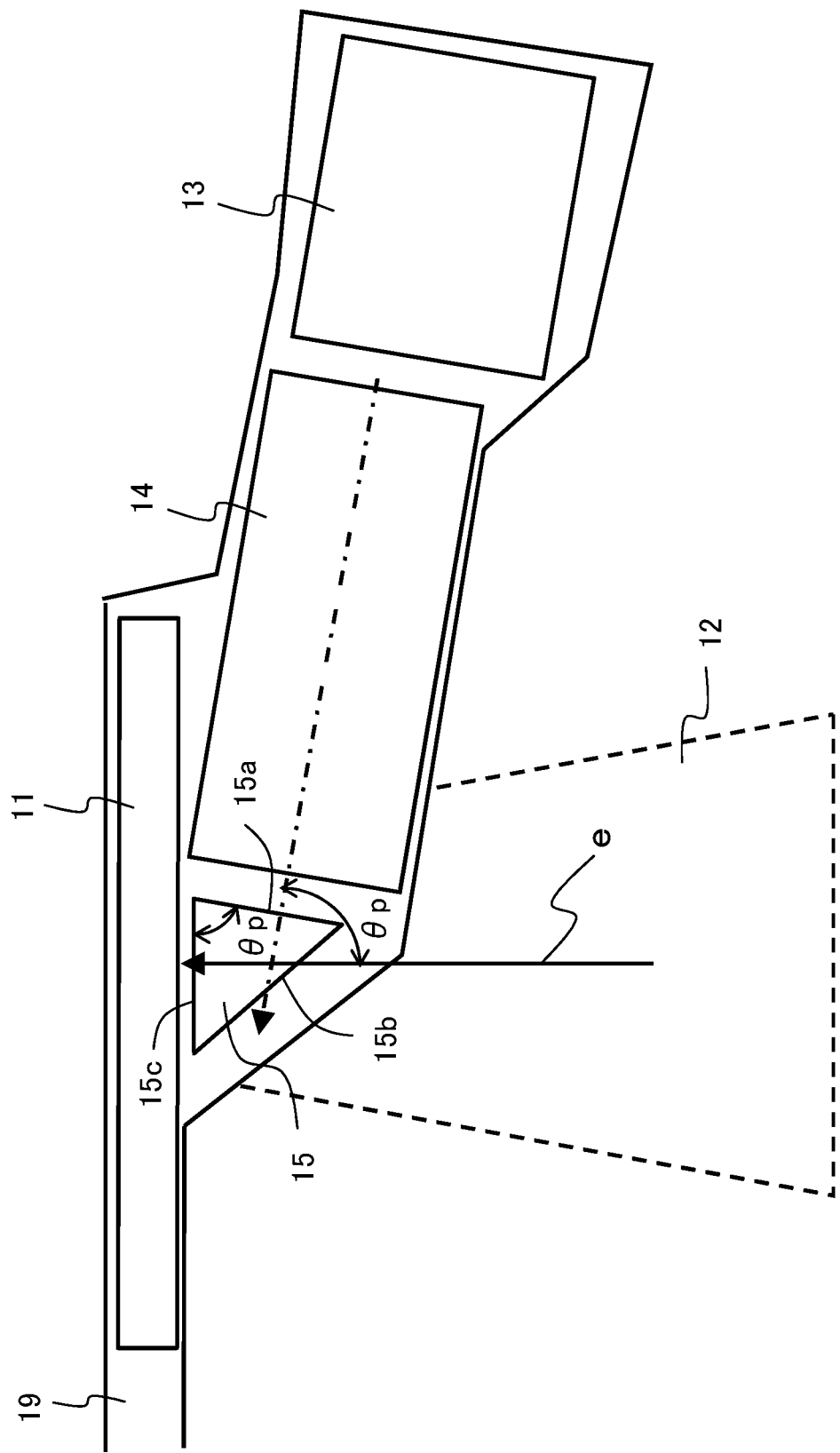

VIRTUAL IMAGE PROJECTION DEVICE

TECHNICAL FIELD

The present invention relates to a virtual image projection device, such as a head mounted display.

BACKGROUND ART

Conventionally, a virtual image projection device that is referred to as a head mounted display (in the following, which is abbreviated to HMD), which is mounted on the head of a user by the user, is known. The user visually recognizes the virtual images of moving images or still images that are displayed by the HMD, and thus the user can acquire various pieces of information.

In order to enable the use of the HMD under various environments, there is a request to carry the HMD. In order to carry the HMD, the HMD has to be in a small size. In order to carry and drive the HMD, a form is thought in which a battery is mounted for use. In order to increase the luminance of images and to prolong drive time, it is necessary to increase the discharge capacity of a battery. More specifically, in a binocular HMD, when images displayed on each of the left and the right eyes by simultaneously lighting a light source to create the images, the power consumption of the light source is increased. A battery that withstands a large power consumption and has a large discharge capacity is increased in size, and the HMD is also increased in size.

In regard to this, PTL 1 discloses a virtual image display device in which a video light beam is guided by a prism-shaped member to create an intermediate image and thus the overall optical system can be reduced in size.

Citation List

Patent Literature

PTL 1: Japanese Unexamined Patent Application Publication No. 2014-174429

SUMMARY OF INVENTION

Technical Problem

In order that the HMD displays images, an optical system is necessary having a function in which a light beam is applied to a display by light emission of a light source included in the HMD and a projection system creates a virtual image using a video light beam created by the display. The light beam from the light source is guided to the display by an illumination system. However, in order to provide bright video to the light emission of the light source per unit, a highly efficient illumination system is necessary. In order that the video light beam created by the display is entered to the eye of a user for recognizing video, a projection system that converts the video light beam into a ray bundle that forms an image on the retina. When a highly efficient HMD is desired to be achieved, it is necessary to improve the efficiency of the illumination system. As a result, the illumination system is prone to increase in size. In order to reduce the size of the optical system of the HMD, a space in which the illumination system and the projection system are combined has to be reduced.

The virtual image display device described in PTL 1 has a configuration in which a video light beam is reflected in the inside of the light guide member to create an intermediate image. According to this, it is possible to achieve a bright display having a wide angle of view while the overall optical system is reduced in size and weight. However, since the light guide member is a block made of a transparent material with a curved surface, there is a problem that weight is increased.

An object of the present invention is to provide a highly efficient virtual image projection device in a small size with no degradation in the luminance efficiency of an optical system in the virtual image projection device.

Solution to Problem

The present invention is a virtual image projection device that shows video to a human eye, the virtual image projection device including a virtual light source surface configured to emit a light beam in a predetermined angular distribution, an image forming lens configured to condense a light beam from the virtual light source surface, and a display configured to create video. When the virtual light source surface is disposed at a nearly focal position on a front side of the image forming lens, the display is disposed at a nearly focal position on a rear side of the image forming lens.

Advantageous Effects of Invention

According to the present invention, the illumination system is reduced in size with no degradation in an effective luminous light beam, the illumination system is combined with the projection system in a small size, and thus a highly efficient virtual image projection device in a small size that displays images of high luminance can be provided while the supply of electric power to the light source is suppressed.

BRIEF DESCRIPTION OF DRAWINGS

FIG. 3A is a front view showing an example configuration of the video display unit 10.

FIG. 3B is a top view showing an example configuration of the video display unit 10.

FIG. 9A is a diagram showing an example configuration of an image forming lens 117 (Example 2).

FIG. 9B is a diagram showing an example configuration of the image forming lens 117.

FIG. 10 is a diagram showing an example configuration of the image forming lens 117.

FIG. 12 is a diagram showing a modification of the configuration of disposing a display 120 (Example 4).

FIG. 13 is a diagram showing a modification of the configuration of disposing the display 120.

FIG. 14 is a diagram showing the modification of a video-light-beam coupling unit 15 (Example 5).

DESCRIPTION OF EMBODIMENTS

In the following, the embodiments of the present invention will be described in detail using the drawings. In the following description, a head mounted display (HMD) is taken as a virtual image projection device. However, a device that can display virtual images which can be visually recognized by a user is included the scope of the present invention.

EXAMPLE 1

Figure 1A:
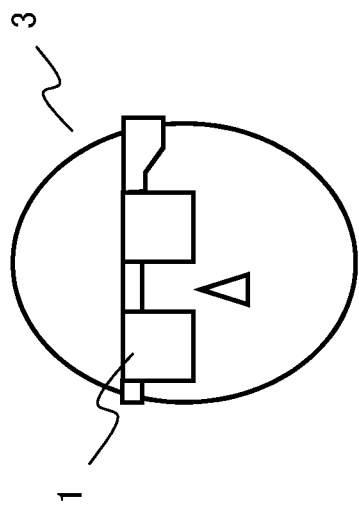
FIG. 1A is a diagram showing the schematic configuration of an HMD 1 mounted on the head of a user 3.
Figure 1B:
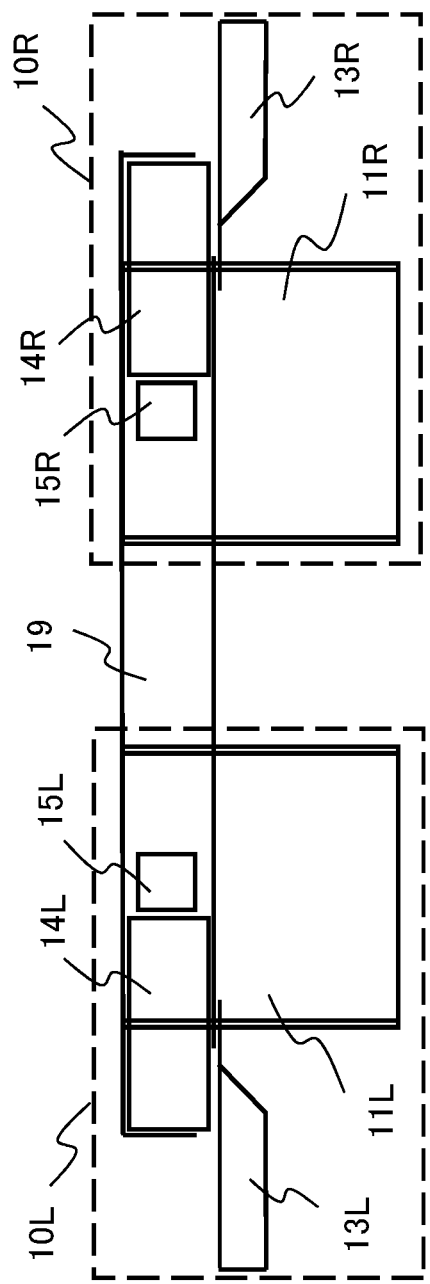
FIG. 1B is a diagram showing the front of the HMD 1 (Example 1).
Figure 1C:
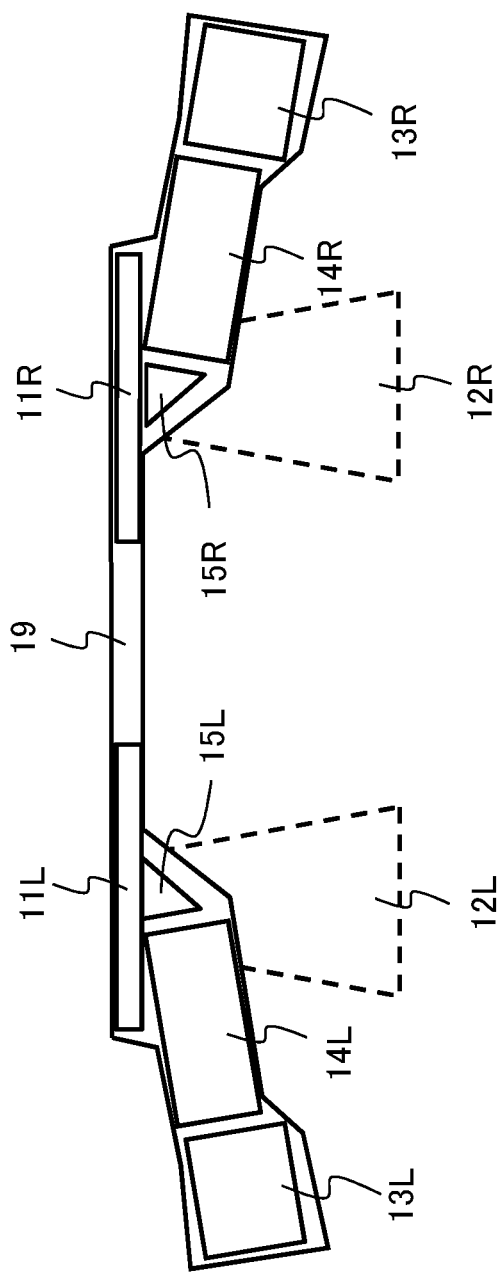
FIG. 1C is a diagram showing the top surface of the HMD 1.

FIGS. 1A to 1C are diagrams showing the use form and the schematic configuration of a binocular HMD. FIG. 1A shows the schematic configuration of a binocular HMD 1. A user 3 mounts the binocular HMD 1 on his/her head, and visually recognizes left and right images displayed by the binocular HMD 1.

FIG. 1B is a diagram showing the front of the HMD 1 according to Example 1, and is a diagram of the HMD 1 viewed from the side where the user 3 mounts the HMD 1. The binocular HMD 1 includes a right-eye video display unit 10R and a left-eye video display unit 10L, a right-eye light guide unit 11R and a left-eye light guide unit 11L, and a retaining unit 19. The right-eye video display unit 10R includes an illumination unit 13R and a projection unit 14R, and the left-eye video display unit 10L includes an illumination unit 13L and a projection unit 14L. The right-eye video display unit 10R and the left-eye video display unit 10L, and the right-eye light guide unit 11R and the left-eye light guide unit 11L respectively include a right-eye video-light-beam coupling unit 15R and a left-eye video-light-beam coupling unit 15L. The retaining unit 19 is a casing that retains all or some of the components of the binocular HMD 1. The user 3 mounts the device including at least the retaining unit 19 on the head, and uses the binocular HMD 1.

FIG. 1C is a diagram showing the top surface of the HMD 1 according to Example 1. The right-eye video display unit 10R and the left-eye video display unit 10L respectively create a right-eye image and a left-eye image, and emit a video light beam 12R and a video light beam 12L. Luminous light beams are applied from the illumination unit 13R and the illumination unit 13L, and the video light beam 12R and the video light beam 12L are emitted through the projection units 14R and 14L, and are guided to the right eye of the user 3 and the left eye of the user 3 respectively by the right-eye light guide unit 11R and the left-eye light guide unit 11L. A part or all the video light beam 12R and the video light beam 12L guided to the right eye of the user 3 and the left eye of the user 3 reach the retina, not shown, of the user 3.

In the following, in regard to the right-eye video display unit 10R and the left-eye video display unit 10L, the right-eye light guide unit 11R and the left-eye light guide unit 11L, the video light beam 12R and the video light beam 12L, the illumination unit 13R and the illumination unit 13L, the projection unit 14R and the projection unit 14L, and the video-light-beam coupling unit 15R and the video-light-beam coupling unit 15L, in the case in which it is unnecessary to distinguish between the left and the right, these components are collectively described as the video display unit 10, the light guide unit 11, the video light beam 12, the illumination unit 13, the projection unit 14, and the video-light-beam coupling unit 15.

Figure 2:
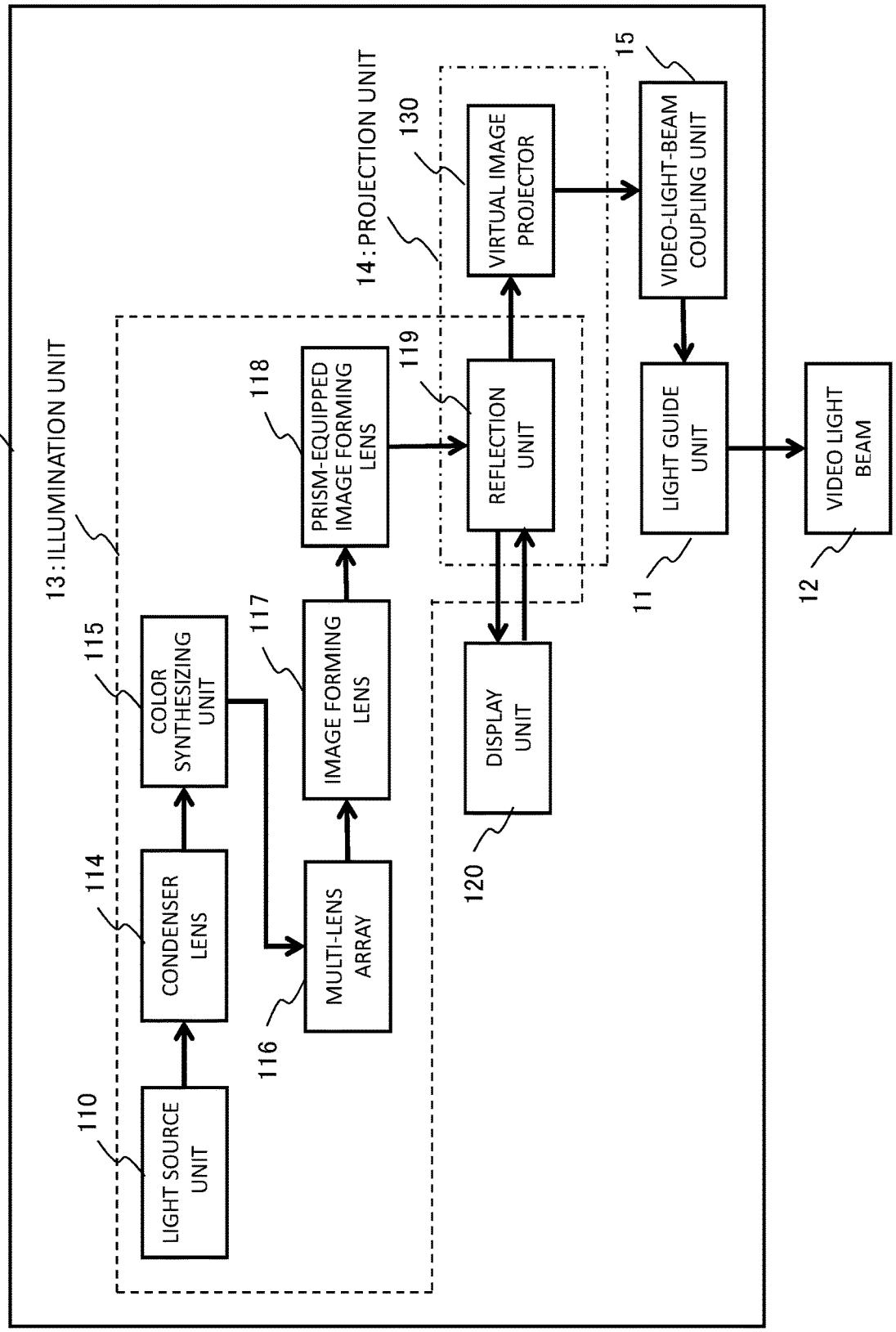
FIG. 2 is a diagram showing an example configuration of the video a display unit 10.

FIG. 2 is a diagram showing an example configuration of the video display unit 10. The video display unit 10 includes a light source unit 110, a condenser lens 114, a color synthesizing unit 115, a multi-lens array 116, an image forming lens 117, a prism-equipped image forming lens 118, a reflection unit 119, a display 120, and a virtual image projector 130.

The light source unit 110 emits a light beam from which the video display unit 10 creates images. The light source unit 110 includes a light source that emits a red (R) light beam, a light source that emits a green (G) light beam, and a light source that emits a blue (B) light beam. The light source unit 110 in turn periodically lights these light sources, and displays full color images by a field sequential mode. The light beam emitted from the light source unit 110 is entered to the condenser lens 114.

The condenser lens 114 forms a ray bundle emitted from the light source unit 110 into a nearly parallel light beam (in the following, referred to as a collimated light beam).

The color synthesizing unit 115 selectively reflects and transmits the ray bundle depending on the wavelength of the ray bundle emitted from the light source unit 110, synthesizes the ray bundles of the colors, and creates a luminous light beam that provides the full-color video light beam 12.

The multi-lens array 116 includes plurality of lenses opposite to an incident surface and a light-emitting surface. The lenses provided on the incident surface condense the incident nearly collimated light beam to the lenses provided on the light-emitting surface. On the other hand, the lenses provided on the light-emitting surface of the multi-lens array 116 emit light beams in a light distribution corresponding to the aperture shapes of the lenses provided on the opposite incident surface.

The image forming lens 117 forms an image of the ray bundle emitted from the multi-lens array 116 toward the display 120. The image that is formed is the image that images of the apertures of the lenses provided on the incident surface of the multi-lens array 116 are overlaid. Although the intensity distribution of a light beam applied to the apertures provided on the multi-lens array 116 is not uniform, the light beam is overlaid by the image forming lens 117, for example, on the subsequent stage, and thus a luminous light beam having a uniform intensity distribution can be provided. That is, video with suppressed variations in luminance can be advantageously provided.

The prism-equipped image forming lens 118 changes the traveling direction of the outgoing light beam of the image forming lens 117. The traveling direction of the outgoing light beam is changed, and thus the arrangement of the illumination unit 13 and the projection unit 14 is formed in a deflected shape, other than the straight line, leading to advantageously improving the degree of freedom of design.

The reflection unit 119 is configured such that the reflection unit 119 reflects the incident light beam as well as reflects the incident light beam at least once, and the reflection unit 119 may transmit the light beam depending on the orientation of polarization. In the case of using a liquid crystal panel, for example, that creates video on the display 120 using polarization, an effective light beam that is to be video is separated from an unnecessary light beam to create the video light beam 12. In the case in which the light beam transmitted through the display 120 that is used becomes the video light beam 12 like a transmissive liquid crystal panel, an optical member that transmits no light beam may be used for the reflection unit 119.

The display 120 includes a reflective LCOS (Liquid Crystal On Silicon), for example, and modulates the light beam entered from the light source unit 110 to create images based on a video signal. However, in the case of the field sequential mode, the display 120 is not provided with a filter and the like that converts colors, and creates images in almost the same color as the incident light beam. The light beam of the image created by the display 120 becomes the video light beam 12, and the video light beam 12 is entered to the virtual image projector 130.

The virtual image projector 130 projects the image that is on the display 120. In order to form the image that is on the display 120 on the retina as though the image is present at a desired distance from the user 3, the virtual image projector 130 provides the image on the video display unit 10 as a virtual image. In order that the display 120 provides the image as a virtual image, the video light beam 12 created in this manner goes to the light guide unit 11 through the video-light-beam coupling unit 15.

The video-light-beam coupling unit 15 receives the video light beam 12 projected by the virtual image projector 130, internally reflects the video light beam 12 on the plane included in the video-light-beam coupling unit 15, and emits the video light beam 12 in the direction almost vertical to the light guide unit 11. The video-light-beam coupling unit 15 may use total reflection on the reflection surface, or in the case in which the video light beam 12 that transmits the inside is entered at an angle smaller than the critical angle to the normal of the reflection surface, mirror coating may be applied in order to prevent losses due to leakage. When the total reflection surface can be used, a cost increase due to mirror coating can be avoided, and the video light beam 12 can be propagated highly efficiently at low costs. When mirror coating is used, the restriction of the critical angle determined by the refractive index of the video-light-beam coupling unit 15 is not imposed, and the degree of freedom of design of the retaining unit 19 is advantageously improved.

The light guide unit 11 captures the video light beam 12 created by the display 120 from the virtual image projector 130, internally reflects the video light beam 12, and guides the video light beam 12 to the front of the eye of the user 3. The light guide unit 11 emits the video light beam 12 from the region of the light guide unit 11 opposite to the eye, and causes the video light beam 12 to form an image on the retina of the user 3. With the configuration, the restriction on the positional relationship between the virtual image projector 130 and the eye of the user 3 is relaxed, the disposition of the virtual image projection device can be freely set, and the situations can be avoided in which the eye of the user 3 is displaced from the pupil of the virtual image projector 130 to lose a part or all the video. Thus, the virtual image that the user 3 easily see can be advantageously provided. For the internal surface reflection of the light guide unit 11, hologram using diffraction phenomena, a mirror of mirror reflection, a half mirror that splits the incident ray bundle into a transmitted light beam and a reflected light beam, and total reflection.

In the optical components described above, the illumination unit 13 is composed of the light source unit 110, the condenser lens 114, the color synthesizing unit 115, the multi-lens array 116, the image forming lens 117, the prism-equipped image forming lens 118, and the reflection unit 119. When the display 120 is applied with light beams, some of the components may be omitted.

The projection unit 14 is composed of an optical component present between the virtual image projector 130 to the display 120. For example, when the reflection unit 119 transmits the video light beam 12 created by the display 120, the projection unit 14 is formed in consideration of the transmission properties and refraction of the reflection unit 119. The back focus position of the virtual image projector 130 extends depending on the refraction of the reflection unit 119 and the distance at which the video light beam 12 transmits the inside of the reflection unit 119. Since the back focus of the projection unit 14 extends longer from the back focus position of the virtual image projector 130, the projection unit 14 has to be disposed such that the extending distance is corrected. In the case in which the illumination unit 13 and the projection unit 14 are formed in separate components, the degree of freedom is present in the relative disposition, this leads to a room that optimizes variations in the optical performance due to the disposition mis-alignment of the optical component that constitutes the illumination unit 13, for example, and variations in the optical performance due to the disposition mis-alignment of the optical component that constitutes the projection unit 14, for example, in the assembly of the video display unit 10. Since the illumination unit 13 and the projection unit 14 can be handled independently, the adjustment of the optical components that constitute the illumination unit 13 and the projection unit 14 becomes easy in the assembly of the illumination unit 13 and the projection unit 14. Therefore, when the illumination unit 13 and the projection unit 14 are composed of separate components, the illumination unit 13 and the projection unit 14 are adjusted in assembly, and the video display unit 10 of high performance is easily provided.

FIGS. 3A and 3B are diagrams showing an exemplary configuration of the video display unit 10. FIG. 3A shows a front view showing, and FIG. 3B shows a top view. In order to cause the video display unit 10 to provide color video, the light source unit 110 includes a light source unit 110G and a light source unit 110RB for three color light emission.

The light source unit 110G emits a green light beam (G light beam), and the light source unit 110RB emits red and blue light beams (an R light beam and a B light beam). On the light source unit 110RB, a light source unit 110R and a light source unit 110B are mounted on the same package. In FIGS. 3A and 3B, the light source unit 110RB in which two colors are mounted on the same package is shown as an example. However, three light sources may be mounted in separate packages, or two or more light sources may be mounted integrally in one package. In the following, "the light source unit" is simply referred to as "the light source".

A light beam emitted from any of the light sources 110RB and 110G is entered to the condenser lens 114. The condenser lens 114 is disposed in relationship in which the light source units 110 are located at nearly the synthetic focal position. The ray bundle emitted from the light source unit 110 is entered to the condenser lens 114 to be a collimated light beam. The collimated light beams from the light source units 110 are emitted toward the color synthesizing unit 115.

FIG. 3B shows an example of using a dichroic mirror in a wedge shape for the color synthesizing unit 115. The dichroic mirror synthesizes the light beams such that the optical axes of the R light beam, the B light beam, and the G light beam are aligned, and synthesizes and emits collimated light beams in these colors.

The multi-lens array 116 receives the nearly collimate ray bundle emitted from the color synthesizing unit 115. The nearly collimated light beam is created at the condenser lens 114, and is a collimate ray bundle having a spread of the light beam corresponding to the light-emitting region of the light source unit 110. When the collimate ray bundle is condensed at the lenses provided on the incident side of the multi-lens array 116, the image that is on the light source unit 110 is formed on the lenses on the emission side of the multi-lens array 116. The lenses provided on the emission side of the multi-lens array emit a ray bundle in a light distribution corresponding to the aperture shapes of the lenses provided on the incident side of the multi-lens array.

The ray bundle emitted from the multi-lens array is entered to the image forming lens 117. The image forming lens 117 emits the collimated light beam toward the prism-equipped image forming lens 118 while condensing the collimated light beam.

The prism-equipped image forming lens 118 is an optical material that is formed of a transparent material and has an incident surface, a reflection surface, and a light-emitting surface. As shown in FIG. 3A, the prism-equipped image forming lens 118 includes a lens on the incident surface inclined to the optical axis of the image forming lens 117, a flat reflection surface, and the light-emitting surface. These are integrally molded, and the lens may be formed as an aspherical lens so as to correct aberration. With the image forming lens 117 and the prism-equipped image forming lens 118, the traveling diction of the collimated light beam emitted from the multi-lens array 116 is deflected at a nearly right angle while condensing the collimated light beam.

The reflection unit 119 has a reflection performance of polarization selectivity. For example, the reflection unit 119 reflects an S-polarized light beam, and transmits a P-polarized light beam. In FIG. 3A, in the ray bundle emitted from the prism-equipped image forming lens 118, the S-polarized light beam is reflected and applied to the display 120. The luminous light beam becomes a nearly analog to the aperture shape of the lens cell provided on the incident side of the multi-lens array 116.

The display 120 shown in FIG. 3A shows an example of a reflective LCOS. In the present configuration, the luminous light beam entered from the reflection unit 119 to the display 120 is the S-polarized light beam. In order that the polarization of the incident luminous light beam is spatially modulated corresponding to a video signal and the incident luminous light beam is caused to brightly glow as effective pixels for video, the polarized light beam is turned to be a P-polarized light beam. With the use of the polarization selectivity of the reflection unit 119 in which the P-polarized light beam is transmitted, the video light beam 12 is transmitted toward the virtual image projector 130. In the case in which micro irregularities or warping is present on the surface of the reflection unit 119, the video light beam 12 is refracted on the micro irregularity surfaces when the video light beam 12 is transmitted, leading to a cause that video is disturbed. However, in regard to reflection, in the case in which the plane of the reflection unit 119 has disturbance, a slope of one degree, for example, the reflected light beam is shifted at an angle of 2°. However, the disturbance of refraction in the case in which the video light beam 12 is transmitted is smaller than this shift. In regard to the use of the luminous light beam, the video light beam 12 is not created yet even though the luminous light beam is warped, and the luminous light beam does not reach the eye of the user 3. Thus, the luminous light beam has less visual influence. However, when the video light beam 12 is warped, there is a possibility that the eye of the user 3 might see the warping as the warping of video. Therefore, when the video is created by the mode in which the video light beam 12 is transmitted to the reflection unit 119, this advantageously provides high image quality.

Naturally, the display 120 can adjust the degree of deflection depending on the strength of the video signal to the video light beam 12 and can provide gray scales. The video light beam 12 transmitted through the reflection unit 119 is entered to the virtual image projector 130. The virtual image projector 130 is composed of at least one or more lenses. The virtual image projector 130 has the optical properties that convert the strength of spatial light intensity on the display 120 into a light distribution. In order to configure the virtual image optical system, the display 120 is present on the inner side from the focal position of the virtual image projector 130. For example, in order to form a virtual image in infinity, the focal position is matched with the focal position of the virtual image projector 130. The angle of view of the video light beam 12 to be emitted is determined by the size of the display 120 and the focal length of the virtual image projector 130. The shorter the focal length of the virtual image projector 130 is, or the greater the display 120 is, the greater the angle of view is.

The video-light-beam coupling unit 15 is composed of a prism. Since any prism can shorten the physical distance while the optical path length is maintained rather than folding back by mirror reflection, the device can be advantageously formed in a small size. The angle of view of the video light beam 12 is determined corresponding to the tilt angles of the light guide unit 11 and the virtual image projector 130. In regard to the reflection surface of the video-light-beam coupling unit 15, it is desired to reflect the video light beam 12 off a mirror finished total reflection surface, because there are no optically losses. However, in the case in which the video light beam 12 having a wide angle of view is reflected and a ray bundle that does not satisfy the conditions and leaks, mirror coating may be applied. When the shape of the video-light-beam coupling unit 15 is a shape in which the video light beam 12 is perpendicularly entered to the incident surface of the video-light-beam coupling unit 15 and is perpendicularly emitted to the light-emitting surface, this is desirable because no color separation occurs in the video light beam 12 after emitted and the video display unit 10 of high image quality can be provided. In the case in which the conditions are not satisfied, a color shift occurs in the video light beam 12 due to the difference in the refraction angle caused by the wavelengths in the incidence and emission because of the dispersion of a medium used for the video-light-beam coupling unit 15. When the video-light-beam coupling unit 15 has a columnar shape having an isosceles triangular cross section, the production can be advantageously provided easily at low costs.

The light guide unit 11 propagates through the video light beam 12 emitted from the video-light-beam coupling unit 15 to the position opposite to the eye of the user 3. When the video light beam 12 entered to the light guide unit 11 propagates through the inside of the light guide unit 11 and then the video light beam 12 is emitted, the emission direction has to be maintained. As an optical system that satisfies the conditions, a configuration can be used in which for example, at least one or more hologram elements or one or more half mirrors formed in parallel is included. When the video light beam 12 that has not been transmitted through and has been reflected off the incident surface of the light guide unit 11 is present on the incident surface of the light guide unit 11, the reflected video light beam 12 goes backward through the projection unit 14. The video light beam 12 is then reflected off any optical component, again passed through the projection unit 14, and superposed on the video light beam 12, resulting in a cause of a ghost image that degrades video quality. In order to prevent this, a quarter-wave plate may be provided in front of the entrance part of the light guide unit 11. When the video light beam 12 that possibly becomes a ghost is transmitted and reflected, the deflection is turned at angle of about 90°, and the video light beam 12 is prevented from returning to the projection unit 14 using the reflection unit 119 having polarization selectivity. Thus, the occurrence of ghost images can be prevented. More specifically, a great effect is exerted in the case in which the light guide unit 11 includes a holographic surface and has a reflectance of 4% or more, for example, which is higher than the Fresnel reflectance to the video light beam 12. With such a configuration, a virtual image projection device of high quality that suppresses the occurrence of ghost images can be provided.

Figure 4:
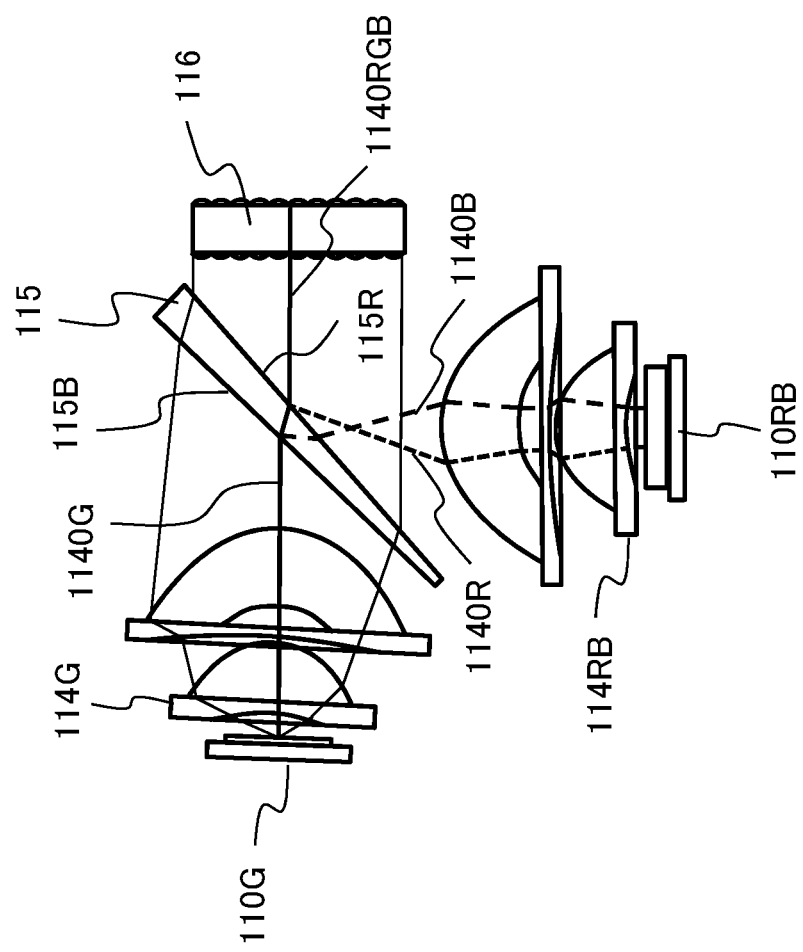
FIG. 4 is a diagram showing an example configuration of a color synthesizing unit 115.

FIG. 4 is a diagram showing the color synthesizing unit 115. The operation of the color synthesizing unit 115 will be described in detail. The condenser lens 114 is a lens disposed in front of the light source units 110, and has a function that collimates an outgoing ray bundle from the light source unit 110. The condenser lens 114 may be composed of one or more lenses or mirrors. In FIG. 4, the condenser lens 114 corresponding to the light source 110G is shown as a condenser lens 114G, and the condenser lens 114 corresponding to the light source 110RB is shown as a condenser lens 114RB. FIG. 4 shows an example in which the condenser lens 114 is composed of two lenses.

FIG. 4 shows an example in which a dichroic mirror is used for the color synthesizing unit 115. In the color synthesizing unit 115, since the tilt angles of the incident surface and the light-emitting surface to the G light beam are different, the refraction angle is different between in incidence and in emission, and the direction of an optical axis 1140G can be changed in the process of the incidence and emission of the G light beam. On the other hand, the color synthesizing unit 115 includes a function that aligns the optical axes of the light source 110R and the light source 110B using a surface 115R and a surface 115B in the surfaces of the dichroic mirror opposite to the light source 110RB. The surface 115R has wavelength selectivity that reflects the R light beam and transmits the G light beam and the B light beam that are light beams having a wavelength shorter than the R light beam. The surface 115B has wavelength selectivity that the light beam having a wavelength shorter than the B light beam and transmits the G light beam or the R light beam having a wavelength longer than the B light beam. An optical axis 1140R of the R light beam from the light source 110RB is reflected off the surface 115R, and matched with the optical axis 1140G of the G light beam. An optical axis 1140B of the B light beam is refracted on the surface 115R, transmitted through the surface 115R, reflected off the surface 115B, and again entered to the surface 115R. When the B light beam is emitted in air, the optical axis 1140B of the B light beam is refracted, and matched with the optical axis 1140G of the G light beam. As a result, the optical axes of the light beams in three colors are nearly matched with each other to form an optical axis 1140RGB, and the light beam is emitted toward the multi-lens array 116.

In order to form the configuration, when viewed in the orientation of FIG. 4, the light source 110R that emits the R light beam is disposed on the left side, the light source 110B that emits the B light beam is disposed on the right side, and the color synthesizing unit 115 is disposed at the position apart from the position at which the optical axis 1140R once intersects with the optical axis 1140B after the light beam is passed through the condenser lens 114RB. The cross section of the color synthesizing unit 115 having the plane including the optical axis 1140R and the optical axis 1140B as a section is in a wedge shape that is tapered toward the light source 110RB side, and the color synthesizing unit 115 is directed in which the light source 110R side is a slope in the direction apart from the light source 110RB. In regard to the sequence of the surface of the color synthesizing unit 115 opposite to the light source 110RB, the color synthesizing unit 115 only has to be disposed in the attitude in which the surface 115R is disposed close to the light source 110RB from the surface 115B. The light source 110G and the condenser lens 114G are inclined clockwise to the color synthesizing unit 115 in order that the optical axis that has been transmitted through the color synthesizing unit 115 in a wedge shape is aligned with the optical axis 1140RGB. That is, the light source 110RB and the light source 110G are disposed at an angle greater than an angle of 90°. The ray bundles emitted from the light source unit 110G and the light source unit 110RB are passed through the condenser lens 114, emitted as a collimated light beam, synthesized at the color synthesizing unit 115 to be a collimated light beam along the optical axis 1140RGB, and entered to the multi-lens array 116.

For example, for the color synthesizing unit 115, a wedge shape having a vertical angle of 4.39° can be used. In this shape, the light beams in three colors can be synthesized and handled as though the light beams are emitted from one light source unit 110.

Figure 5:
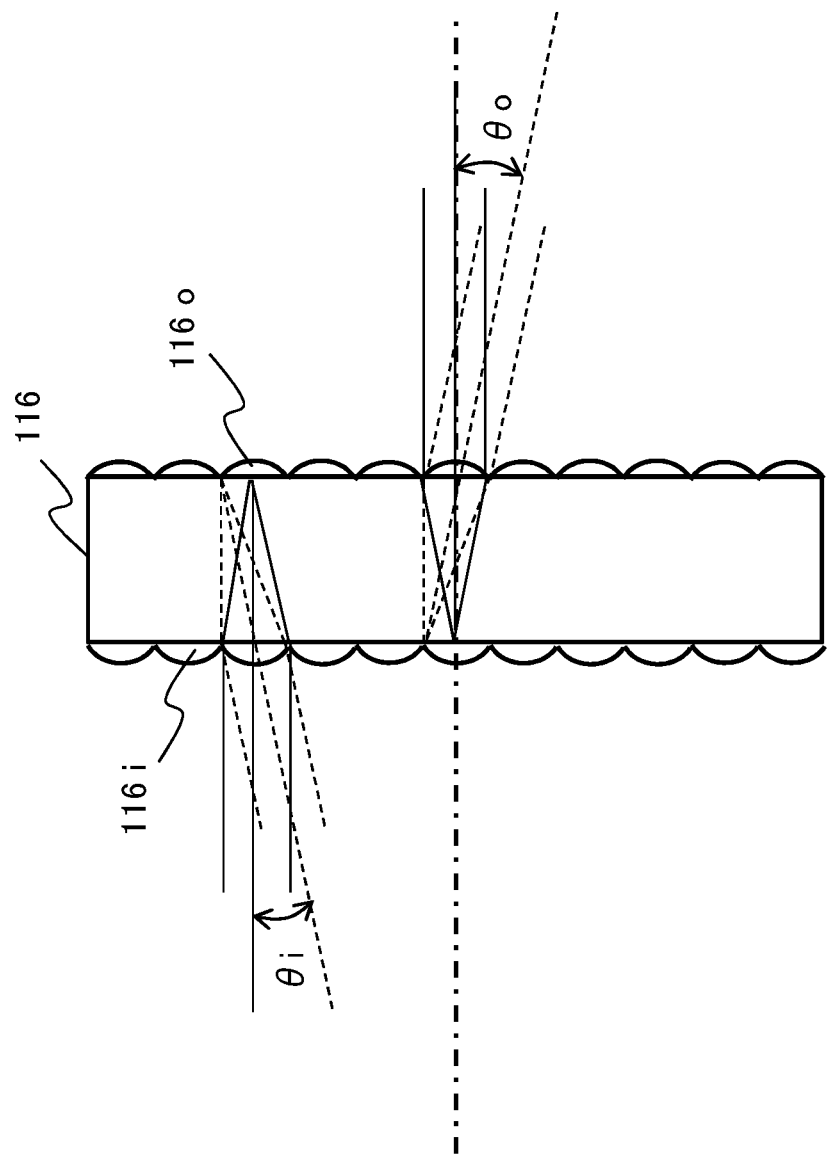
FIG. 5 is a diagram showing the function of a multi-lens array 116.

In FIG. 5, the multi-lens array 116 will be described in detail. A lens cell 116i (incident-side lens cell) provided on the incident side of the multi-lens array 116 desirably forms the image that is on the light source unit 110 on the aperture of a lens cell 116o (emission-side lens cell) provided on the emission side of the multi-lens array 116. In order to achieve this, the F value of the luminous light beam entered to the incident-side lens cell 116i only has to be greater than the F value of the incident-side lens cell 116i.

With the configuration, the optical system including components from the condenser lens 114 to the incident-side lens cell 116i enables forming the image that is on the light source smaller than the aperture of the emission-side lens cell 116o. That is, in the case in which the aperture of the emission-side lens cell 116o is greater than, the light-emitting region of the light source, the focal length of the incident-side lens cell 116i is short to the focal length of the condenser lens 114. Since the position at which the collimated light beam emitted from the condenser lens 114 forms an image is the focal position, the thickness of the multi-lens array 116 is almost the same as the focal length of the incident-side lens cell 116i. On the other hand, the effective aperture of the entire multi-lens array 116 only has to sufficiently receive the luminous light beam from the condenser lens 114. Therefore, in the case in which the aperture of the multi-lens array 116 is applied with the luminous light beam in a nearly circular shape, the shape of the aperture is formed in a circular shape or a nearly square circumscribing the circular shape, for example, and thus the luminous light beam can be entered neither too much nor too little, and this is highly efficient.

With the configuration, since the incident light beam to the multi-lens array 116 falls in the inside of the aperture of the emission-side lens cell 116o, the incident light beam can be advantageously emitted highly efficiently with no loss at the aperture.

The emission-side lens cell 116o has a function that converts the aperture shape of the incident-side lens cell 116i of into a light distribution and emits a collimated light beam. That is, the focal position of the emission-side lens cell 116o is nearly matched with the incident-side lens cell 116i. When the incident-side lens cell 116i is regarded as a secondary light source, the focal length is determined from the angle of divergence of a ray bundle going to the image forming lens 117.

Therefore, the focal length of the incident-side lens cell 116i, the focal length of the emission-side lens cell 116o, and the thickness of the multi-lens array 116 are almost the same. From the conditions, a divergence angle θi of the incident light beam of the ray bundle entered to the multi-lens array 116 is equal to a divergence angle θo of the outgoing light beam. Although not shown in FIG. 5, a ray bundle having a spread of the ray bundle emitted from the condenser lens 114 smaller than the divergence angle θi of the incident light beam can be emitted from the emission-side lens cell 116o with no loss. Thus, a highly efficient illumination system having a high transmittance can be advantageously configured.

Figure 6:
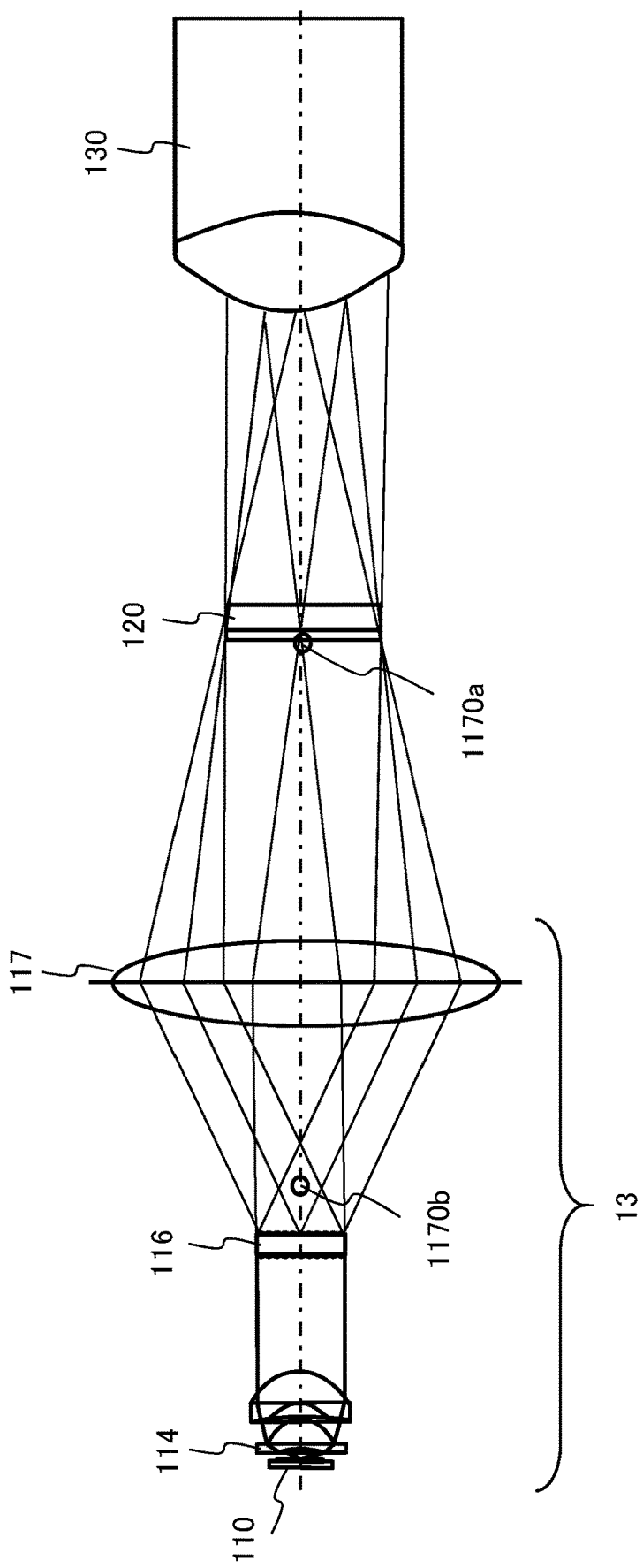
FIG. 6 is an illustration of the positional relationship between a virtual light source and an image forming lens 117.
Figure 7:
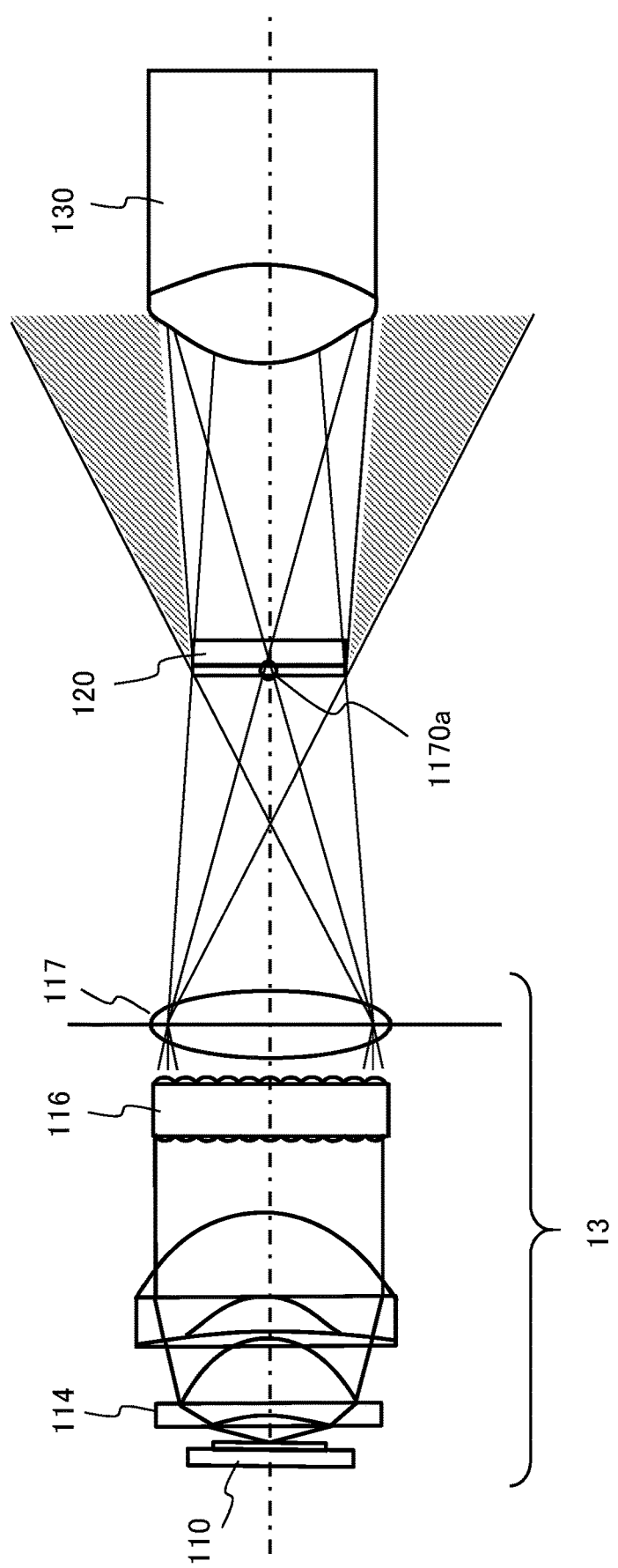
FIG. 7 is a diagram showing the case in which the virtual light source comes close to the image forming lens 117.
Figure 8:
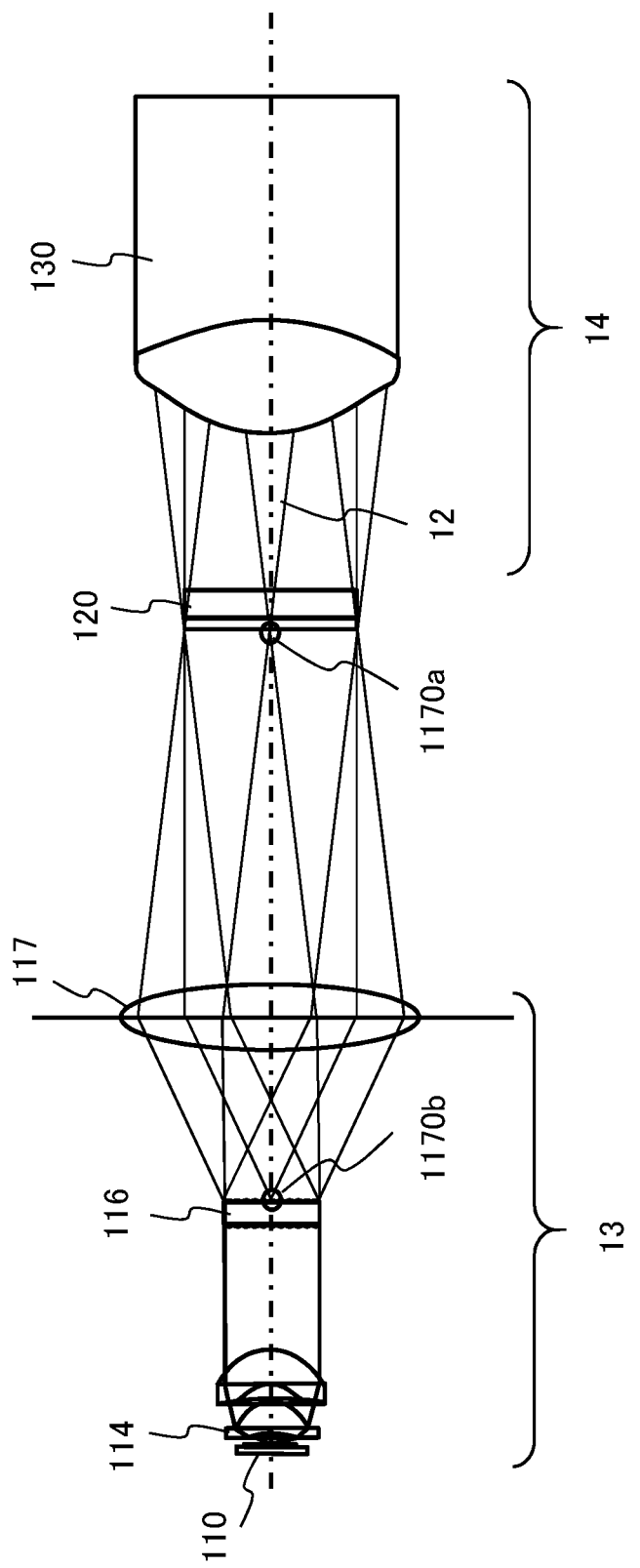
FIG. 8 is an illustration of the positional relationship between the virtual light source and the image forming lens 117.

In FIGS. 6, 7, and 8, the positional relationship between the multi-lens array 116 and the image forming lens 117 will be described in detail. The multi-lens array 116 may be other virtual light source surfaces.

In order to improve the efficiency, and the uniformity of the luminous light beam, the configuration is used in which the multi-lens array 116, the light source unit 110, and the condenser lens 114 are combined. However, the other light sources of surface emission can also be used as a virtual light source surface instead of the configuration above. For example, a flat surface light source, such as an OLED (Organic Electro-Luminescence), or a light source that combines a laser light source with a transmissive diffuser may be fine.

FIG. 6 shows an example positional relationship between the multi-lens array 116 and the image forming lens 117. The multi-lens array 116 is located in the direction apart from the front-side focal point 1170b of the image forming lens 117 to the image forming lens 117.

In regard to the display 120, a transmissive video display device is shown as an example. For example, a transmissive liquid crystal element can be used. Of course, other video display devices, such as a reflective video display device, may be used. The virtual image projector 130 includes a function that receives an outgoing light beam modulated at the display 120 and projects a virtual image.

Since the luminous light beam emitted from the multi-lens array 116 is a ray bundle having an angle, the luminous light beam spreads until the luminous light beam reaches the image forming lens 117. FIG. 6 shows a manner in which the distance between the image forming lens 117 and the multi-lens array 116 is provided sufficiently, the aperture of the image forming lens 117 is applied wide enough. The luminous light beam from the multi-lens array 116 is entered to the image forming lens 117, and forms an image at the rear-side focal point 1170a. The image is the real image of the lens cell 116i provided on the incident surface of the multi-lens array 116. The multi-lens array 116 is disposed being nearly matched with the rear-side focal point 1170a of the image forming lens 117 such that the real image of the lens cell 116i is nearly matched with the display 120. With the configuration, the luminous light beam emitted from the multi-lens array 116 can be advantageously efficiently applied to the display 120 neither too much nor too little.

Since the multi-lens array 116 is at the position apart from the front-side focal point 1170b of the image forming lens 117 to the image forming lens 117, the ray bundle emitted from the image forming lens 117 is emitted in the convergence direction. The ray bundle having been passed through the image forming lens 117 forms an image at almost the same as the position of the display 120, and travels in the convergence direction toward the optical axis of the image forming lens 117. Therefore, the ray bundle is efficiently taken into the virtual image projector 130, and a virtual image projection device with losses suppressed can be provided. The multi-lens array 116, the condenser lens 114, and the light source unit 110 can be disposed in a small size, and thus a small-sized virtual image projection device can be provided.

For example, it is assumed that in the multi-lens array 116, the period of the lens cell 116i and the lens cell 116o in the lateral direction is 0.502, the period in the vertical direction is 0.283, the radius of curvature is 0.51, and the thickness is 1.2, a luminous light beam at F 2.4 in the lateral direction is obtained. In the case in which a luminous light beam having another F value is necessary, it is assumed that the shapes of the lens cells 116i and 116o are not changed, for example, and then a shape only has to be provided in which the radius of curvature and the thickness between the lens cell 116i and the lens cell 116o are almost proportional to a desired F value. However, in order to increase the F value, the transmittance is prone to be reduced due to the restriction on the luminous light beam from the light source. Therefore, the size of the lens cells 116i and 116o may be changed to adjust the F value to a value by which the radius of curvature and the distance between the lenses are easily achieved.

When the F value is F 2.4, the effective aperture of the multi-lens array 116 may be in a nearly square at 5.44 in the lateral direction and 5.53 in the vertical direction, for example. This shape only has to be matched with the shape of the application range of the light beam applied from the light source unit 110 in the previous stage, which does not depend on the F value of the luminous light beam emitted from the multi-lens array 116.

FIG. 7 shows a configuration in which the multi-lens array 116 comes close to the image forming lens 117. The outgoing light beam of the multi-lens array 116 is condensed at the image forming lens 117, and forms an image at the rear-side focal point 1170a of the image forming lens 117.

In the case of the configuration in FIG. 7, the outgoing light beam from the multi-lens array 116 forms an image on the display 120, and efficient application is achieved. However, in the ray bundle having been passed through the display 120, the ray bundle on the side depicted by a hatched portion where the ray bundle has an angle to the optical axis fails to be entered to the virtual image projector 130 and fails to be used as a video light beam, resulting in losses. In order to apply a light beam to the display 120, the aperture of the image forming lens 117 has to be entirely applied with the ray bundle. In the configuration of FIG. 7, since the multi-lens array 116 comes close to the image forming lens 117, the equivalent size is necessary to both components. In order to emit the ray bundle from the full range of the aperture of the multi-lens array 116, the equivalent size is also necessary to the condenser lens 114. As described above, when the multi-lens array 116 comes close to the image forming lens 117, the condenser lens 114 and the light source unit 110 are increased in size, and the illumination unit 13 is increased in size.

FIG. 8 shows a modification of the positional relationship between the multi-lens array 116 and the image forming lens 117. The multi-lens array 116 is nearly matched with the front-side focal point 1170b of the image forming lens 117.

Since the ray bundle emitted from the multi-lens array 116 is a ray bundle having an angle, the ray bundle spreads until the ray bundle reaches the image forming lens 117. FIG. 8 shows a manner in which the ray bundle emitted from the multi-lens array 116 sufficiently spreads to the distance between the image forming lens 117 and the multi-lens array 116 and the ray bundle is sufficiently applied to the aperture of the image forming lens 117. Since the front-side focal point 1170b of the image forming lens 117 and the multi-lens array 116 are disposed being nearly matched with each other, the ray bundle emitted from the center of the multi-lens array 116, i.e., the ray bundle emitted from the front-side focal point 1170b of the image forming lens 117 is condensed at the image forming lens 117 to be a collimated light beam that is applied to the display 120. The ray bundle that is applied with an angle to the optical axis emitted from the outgoing aperture of the multi-lens array 116 is a ray bundle that forms an image on the display 120. More specifically, the luminous light beam emitted from the multi-lens array 116 with an angle reaches the display 120 in an angle range in symmetry to the normal of the display 120. With the configuration, even the video light beam 12 that has been passed through the display 120 travels with a symmetric spread to the optical axes of the image forming lens 117 and the virtual image projector 130. With such a video light beam 12, even though the virtual image projector 130 is a telecentric system, the video light beam 12 that has been passed through the display 120 can be efficiently captured, and thus a highly efficient optical system can be provided.

Note that when the virtual image projector 130 composed of a telecentric optical system is used, virtual image projection device having small variations in luminance in the full range of a screen can be advantageously provided.

When attention is focused on the aperture shape of the image forming lens 117, even in any configuration of FIGS. 6, 7, and 8, the aperture of the image forming lens 117 has to be greater than the display 120. With the configuration, the video light beam 12 having a spread going from the full range of the display 120 to the virtual image projector 130 after passed through the display 120 can be provided, and video that suppresses the occurrence of shades in video or a lack of video can be provided.

For the image forming lens 117, a planoconvex lens having an aspherical surface at a radius of curvature of R12.676 and a conic coefficient of −5.063366, for example, can be used. From this, the image forming lens 117 is matched with the luminous light beam of the multi-lens array 116, and is combined with the prism-equipped image forming lens 118 provided in the subsequent stage, and thus an optical system that applies a light beam to the display 120 at F 2.4 can be configured.

As described above, with the configuration of Example 1, the luminous light beam is applied to the display 120 by the illumination unit 13 that is highly efficient and reduced in size, the projection unit 14 that highly efficiently creates and projects a virtual image in full color of high image quality is combined, and thus a small-sized virtual image projection device, which is highly efficient, can be provided.

EXAMPLE 2

In FIGS. 9A, 9B, and 10, an image forming lens 117 according to Example 2 will be described in detail.

To the image forming lens 117, a function is expected in which an outgoing light beam from a multi-lens array 116 forms an image on a display 120 and a virtual image projector 130 provided in the subsequent stage is provided with a video light beam as an effective ray bundle. In order to sufficiently brightly display a video light beam 12 emitted from the virtual image projector 130 in a full range of video, the ray bundle from the display 120 has to have a sufficient spread to the F value at which the virtual image projector 130 can take the ray bundle. To this, the F value of the video light beam 12 emitted from the display 120 has to be made smaller than the F value of the virtual image projector 130. Since the ray bundle emitted from the display 120 has to be efficiently captured in the virtual image projector 130 with no losses, it is fine to avoid the occurrence of a loss light beam that is not captured in the virtual image projector 130 due to the F value, which is unnecessarily reduced, of the outgoing light beam of the display 120. That is, when the virtual image projector 130 is matched with the F value of the luminous light beam, the luminous light beam emitted from the condenser lens 114 is passed through the multi-lens array 116 neither too much nor too little, and the image forming lens 117 efficiently passes the luminous light beam, and applies the luminous light beam to the display 120. When the F value of the video light beam 12 modulated at the display 120, i.e., the F value of the luminous light beam is matched with the F value of the image forming lens 117, losses are suppressed, and efficiency is the highest.

When the F value of the optical component is constant, the focal length becomes long. This is the relationship in which the effective diameter is increased.

In the case in which the display 120 is disposed being nearly matched with the rear-side focal point of the image forming lens 117, in order to intend a reduction in the size of the optical system, the focal length of the image forming lens 117 is desirably shortened. However, when the focal length is shortened, the radius of curvature is reduced. When the radius of curvature is reduced, aberration easily occurs, and the optical performance is prone to be reduced. Thus, the focal length is not enabled to be excessively shortened. Since the image forming lens 117 has to be greater than the display 120, a limit is imposed on a shortened focal length and a reduction in the effective diameter of the image forming lens 117.

FIG. 9A shows a configuration in which the image forming lens 117 is a single lens. In the case in which the F value of the image forming lens 117 is small, the aperture of the image forming lens 117 has to be increased and the focal length has to be shortened. In order to achieve the image forming lens 117 using a single lens, the radius of curvature is inevitably reduced, and the effective diameter necessary to the image forming lens 117 is sometimes not obtained due to a geometric restriction.

FIG. 9B shows an example of a configuration in which the image forming lens 117 is split into two image forming lenses 117a and 117b. Here, a configuration is shown in which a space is present between the split image forming lenses 117a and 117b. However, the image forming lenses 117a and 117b may be integrally molded, or the image forming lenses 117a and 117b may be formed by bonding the image forming lenses 117a and 117b to each other.

In the case in which the synthetic focal length of the split image forming lenses 117a and 117b is matched with the focal length of the image forming lens 117 before split, the radius of curvature of the image forming lenses 117a and 117b can be increased. When the radius of curvature is increased, the edge surface of the lens is easily reserved, and this easily increase the effective diameters of the image forming lenses 117a and 117b rather than forming the image forming lens 117 using a single lens. The spherical aberration also hardly occurs, and the luminous light beam can be more efficiently applied to the display 120.

With the configuration, in the case in which the F value is made constant, the focal length is reduced to achieve a reduction in size while the effective diameter remains large. Conversely, when the focal length is constant, the effective diameter is increased to increase the light beam to be captured. Because of the presence of the relationship, the degree of freedom of design of the optical system can be advantageously improved.

When the F value is matched with the F value of the virtual image projector 130, the virtual image projector 130 can project the video light beam 12 neither too much nor too little after the luminous light beam is applied to the full range of the display 120. Thus, a highly efficient optical system can be provided with losses suppressed.

FIG. 10 shows another form of the image forming lens 117. FIG. 10 shows a configuration in which the image forming lens 117 is split into two image forming lenses 117a and 117b and a prism 117c is inserted. FIG. 10 shows a configuration in which a space is present between the image forming lenses 117a and 117b and the prism 117c. However, the combination of any components, or all the components may be integrally molded, or may be formed being bonded to each other.

In the case in which the image forming lenses 117a and 117b are disposed sandwiching the space to form a composite lens, the insertion of the prism 117c into the space enables physical separation of the image forming lenses 117a and 117b from each other while the optical performance of the composite lens before the prism 117c is inserted is maintained. When the image forming lenses 117a and 117b can be physically separated from each other, a spatial margin can be created between the image forming lenses 117a and 117b, and the degree of freedom of design of the optical system is advantageously improved.

With the utilization of a spatial margin created by the configuration, the prism 117c including a function that deflects the optical axis, for example, and at least one or more the image forming lenses 117a and 117b are integrated with each other to form a component including a reflection surface that deflects the optical axis, and this component can be used as a prism-equipped image forming lens 118.

As described above, with the configuration of Example 2, the image forming lens 117 is split into a plurality of lens surfaces, and thus the radius of curvature can be increased. Thus, a highly efficient illumination system is configured in which the light beam to be captured is increased and spherical aberration is suppressed, and thus a highly efficient virtual image projection device can be provided. with the use of the prism 117c, a virtual image projection device that improves the degree of freedom of design of the optical system can be provided.

EXAMPLE 3

Figure 11:
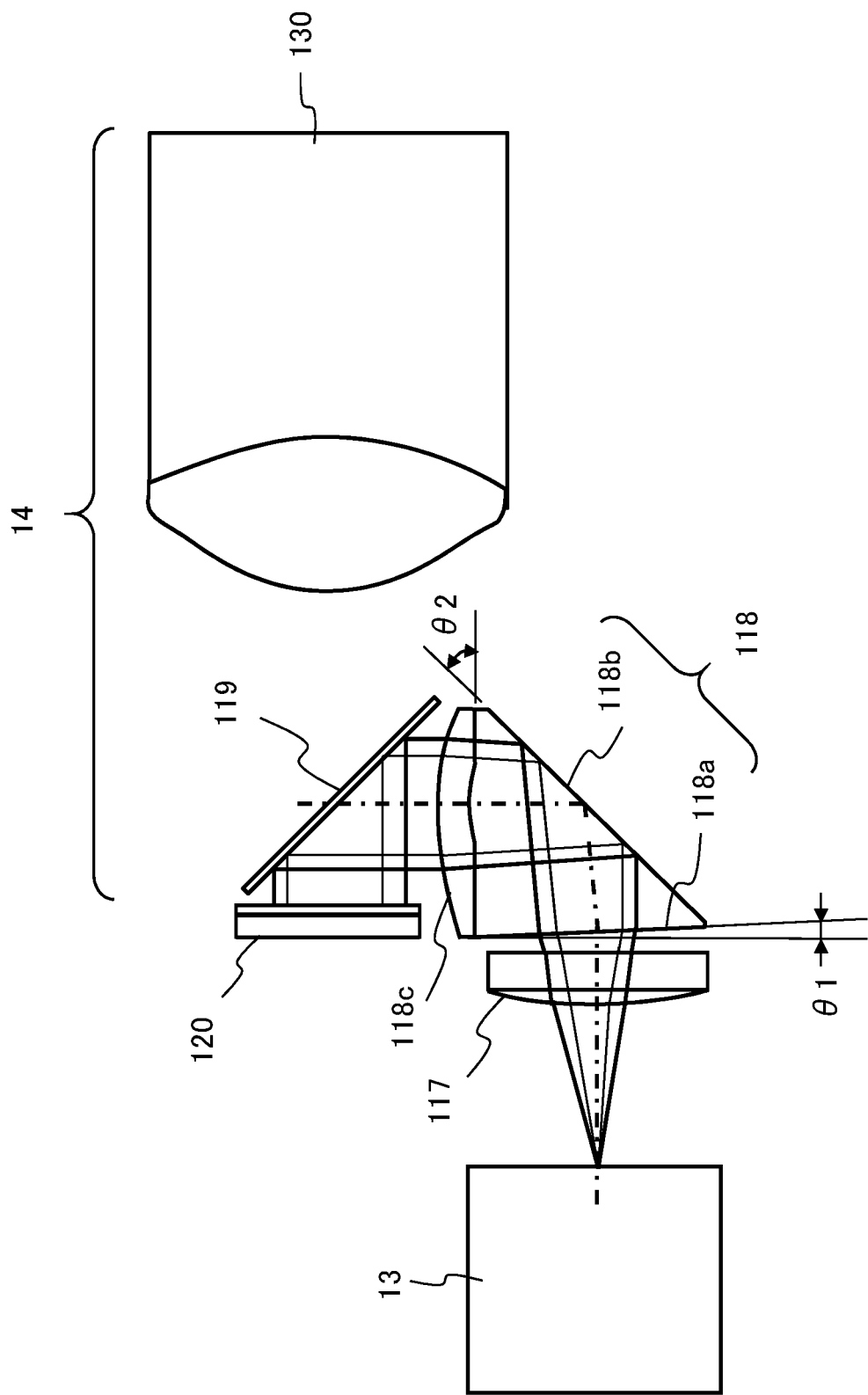
FIG. 11 is a diagram showing an example configuration of a prism-equipped image forming lens 118 (Example 3).

In FIG. 11, a prism-equipped image forming lens 118 according to Example 3 will be described in detail.

The prism-equipped image forming lens 118 includes an incident surface 118a, a reflection surface 118b that reflects the optical axis, and a light-emitting surface 118c. The prism-equipped image forming lens 118 is made of a transparent body. For example, in the case in which the prism-equipped image forming lens 118 is made of a resin, such as an optical plastic, injection molding can be performed using a mold. In injection molding, the prism and the lens can be produced being integrated with each other. On the other hand, in the case in which the prism-equipped image forming lens 118 is composed of a combination of a glass lens and a glass prism, the production costs of the glass lens are increased in the curved surfaces other than the spherical lens, and in order to integrate the glass lens with the prism, the time and effort of optical bonding occur. In order to widen an angle of total reflection, it is effective to improve the refractive index. However, glass of a high refractive index is prone to be expensive compared with a resin having the same refractive index. Therefore, with the use of the prism-equipped image forming lens 118 that is integrally molded using a resin, the production costs of the virtual image projection device can be advantageously reduced.

The prism-equipped image forming lens 118 shown in FIG. 11 is integrally molded in a shape in which the incident surface 118a is inclined to the optical axis of an image forming lens 117 and an aspherical lens is provided on the light-emitting surface 118c. As another method, a method is thought that mirror coating is applied to the reflection surface of an inexpensive glass prism and an aspherical lens is used as another member in combination. However, in the sophistication of the function of the prism-equipped image forming lens 118, in the case in which an aspherical lens is used on the lens surface, for example, the processes of cutting and polishing a glass-made aspherical lens become expensive, or in the case in which the prism-equipped image forming lens 118 is produced using a glass mold, the options of materials is a few options, and becomes expensive. In addition to the production costs of the aspherical lens, the aspherical lens is a member separate from the prism, and polishing the bonding surface to the prism or the accuracy of the bonding position is required for obtaining optical performance, resulting on an increase in production costs. On the other hand, with the configuration in which the prism-equipped image forming lens 118 is integrally molded using a resin, the process necessary for bonding can be omitted because the prism-equipped image forming lens 118 can be integrally molded even though an aspherical lens is used, there are options of materials that can be used for injection molding, and thus the prism-equipped image forming lens 118 can be advantageously inexpensively produced.

In the case of FIG. 11, although the image forming lens 117 is present in a single body, the image forming lens 117 functions as a composite lens by the combination of lenses on the light-emitting surface 118c provided on the prism-equipped image forming lens 118. When the image forming lens 117 is integrally molded, since mold process costs mainly occupy an increase in the production costs of the aspherical lens to the spherical lens, an increase in production costs due to forming an aspherical surface is smaller than the case in which the image forming lens 117 is formed by cutting and polishing. Therefore, in the prism-equipped image forming lens 118 produced in the premise that the prism and the lens are integrally molded, the light-emitting surface 118c is an aspherical lens to suppress an increase in production costs is suppressed, and the image forming lens 117 is a curved surface lens whose production costs are relatively inexpensive. Thus, production costs can be suppressed while the optical performance of a composite lens of the image forming lens 117 and the prism-equipped image forming lens 118 is maintained.

In the prism-equipped image forming lens 118 of the example, the incident surface 118a is inclined to the optical axis of the image forming lens 117. The direction of inclination is the direction in which the optical axis of the image forming lens 117 is refracted to the light-emitting surface 118c side, and the optical axis at a shallow angle to the reflection surface 118b is refracted. With the configuration, the ray bundle is easily in total reflection, and the luminous light beam can be efficiently reflected with no leakage of the ray bundle even though no mirror coating is applied.

The incident surface 118a is inclined to the optical axis of the image forming lens 117 by θ1. The reflection surface 118b is inclined to the outgoing optical axis of the prism-equipped image forming lens 118 by θ2. θ1 and θ2 are determined such that the luminous light beam propagates. As the simplest example, an example of using a prism having a cross section in a rectangular equilateral triangle is thought. In the example in FIG. 11, the case in which θ1=0° and θ2=45°. However, when the F value of the luminous light beam is small, a ray bundle that is close to the normal direction of the reflection surface and that is easily passed is sometimes included. Therefore, when θ2 is increased, the reflection surface 118b becomes shallow to the outgoing optical axis of the prism-equipped image forming lens 118 for easy total reflection. When the outgoing optical axis is followed on the incident side, it is revealed that the optical axis of the image forming lens 117 is inclined. At this time, when it is desired to orthogonally cross the optical axis of the image forming lens 117 with the outgoing optical axis of the prism-equipped image forming lens 118, the incident surface 118a of the prism-equipped image forming lens 118 only has to be inclined such that the tilt angle θ1 is positive. At this time, since θ1>0, a prism having the vertical angle smaller than 90° is achieved. With the configuration, the prism-equipped image forming lens 118 can deflect the optical axis at an angle of 90° before incidence and after emission. Thus, an illumination unit 13 and a projection unit 14 can be combined highly efficiently in a small size.

For example, when the F value of the luminous light beam to be propagated is 2.4, a resin having a refractive index of 1.64 or more is used for the prism-equipped image forming lens 118, and the prism-equipped image forming lens 118 is in a shape in which θ1=2.57° and θ2=45.5°. The luminous light beam can be emitted in total reflection with no leakage of the incident ray bundle. When an aspherical lens having a radius of curvature of 8.879 and a conic coefficient of −1.823791 is formed, the luminous light beam can be applied to the display 120 at F 2.4 in the combination of the prism-equipped image forming lens 118 with the image forming lens 117.

The shape of the display 120 that is an application target generally has an aspect ratio in which the length and the width are different. When the aspect ratio is 16:9, since a light beam is applied to the display 120 neither too much nor too little, the luminous light beam is also desirably applied in a shape of nearly 16:9. In order to allow the displacement between the display 120 and the luminous light beam, a slight margin may be provided, e.g. an increase in the application range by about 5%, and the like. The size of the luminous light beam depends on the F value of the luminous light beam entered to the image forming lens 117. When the application range is narrow on the plane where the display 120 is located, the divergence angle is narrow, whereas when the application range is wide, there is a relationship in which the divergence angle is large. In other words, when the application range is narrow, the F value is large, whereas when the application range is wide, the F value is small. That is, the F value of the luminous light beam entered to the image forming lens 117 is varied between the lateral direction and the vertical direction, and thus the luminous light beam can be applied to the display 120 neither too much nor too little, and the luminous light beam can be highly efficiently applied.

When the aspect ratio of the shape of the display 120 is 16:9, setting the ratio of the F value between in the lateral direction and the vertical direction to 9:16 can achieve highly efficient application of the luminous light beam with losses suppressed. The luminous light beam entered to the image forming lens 117 is the outgoing light beam from a multi-lens array 116, and the aspect ratio of the F value of the luminous light beam depends on the ratio of the shape of a lens cell 116i provided on the incident side of the multi-lens array 116. When the aspect ratio of the lens cell 116i is 16:9, the display 120 having an aspect ratio of 16:9 in an effective screen region can be highly efficiently applied neither too much nor too little.

The prism-equipped image forming lens 118 deflects the optical axis in the short direction of the display 120. With the configuration, the distance between the optical axes of the display 120 and the virtual image projector 130 and the optical axis of the image forming lens 117 can be shortened, and thus an optical system in a small size can be provided. Conversely, it is assumed that the optical axis is deflected in the long direction of the display 120, a space for deflection is increased. Consequently, the distance between the optical axis of the virtual image projector 130 and the image forming lens 117 is increased as well as the effective diameter of the illumination unit 13 is also increased, and thus the configuration of the example is desirable.

As described above, with the configuration of Example 3, an inexpensive prism-equipped image forming lens 118 can be provided in which the prism-equipped image forming lens 118 is produced by integral molding of a resin, the time and effort to bond the aspherical lens and the prism are omitted, a transparent member of a high refractive index is used, and mirror coating is omitted using total reflection.

For the spherical lens of the image forming lens 117, the lens on the light-emitting surface 118c of the prism-equipped image forming lens 118 is an aspherical surface, and thus the overall production costs can be reduced while optical performance is maintained. With the configuration, an inexpensive virtual image projection device in a small size can be provided.

EXAMPLE 4

In FIGS. 12 and 13, a modification of a display 120 according to Example 4 will be described in detail. The display 120 is a reflective type, and a disposition configuration will be described in which a video light beam 12 is reflected by a reflection unit 119 and is guided to a virtual image projector 130.

For the reflective display 120, an LCOS, for example, can be used. The LCOS is an element that receives a polarized light beam as a luminous light beam, spatially changes the polarized light beam, and creates a video light beam. In FIG. 12, for the reflection unit 119, a wire grid film, for example, can be used such that the P-polarized luminous light beam is transmitted. As another method, a PBS (Polarized Beam Splitter) including a prism can also be used. The polarization of the P-polarized luminous light beam transmitted through the reflection unit 119 is spatially converted by the display 120 corresponding to a video signal, and the light beam necessary as the video light beam is converted into an S-polarized light beam. The S-polarized video light beam is guided to the virtual image projector 130 due to the properties that reflect the S-polarized light beam of the reflection unit 119 of polarization selectivity.

With the present configuration, as shown in FIG. 13, the display 120 can be disposed in the direction opposite to the illumination unit 13. The display 120 is sometimes provided with a circuit board that supplies power or signals, a metal plate for heat dissipation or retaining, and any other component on the back surface that is not the side where the video light beam 12 is created. According to the present modification, the disposition that prevents interference of the circuit or a retaining unit 19, for example, in association with the display 120 with the other optical components is enabled.

As another modification, a DMD (Digital Mirror Device) may be used for the display 120. The DMD is an element that expresses the shading of a light beam corresponding to a video signal by switching the slope of a micro mirror corresponding to a video pixel between ON and OFF at high speed. Since the DMD is a video display device that does not depend on polarization, the reflection unit 119 can use a reflective mirror having no polarization dependence.

EXAMPLE 5

In FIG. 14, a modification of a video-light-beam coupling unit 15 according to Example 5 will be described in detail.

After a video light beam 12 projected by a virtual image projector 130 in a projection unit 14 is entered to the video-light-beam coupling unit 15, the video-light-beam coupling unit 15 internally reflects the video light beam 12 on a plane included in the video-light-beam coupling unit 15, and emits the video light beam 12 in the direction almost vertical to a light guide unit 11. When an incident surface 15a and a light-emitting surface 15c of the video-light-beam coupling unit 15 are perpendicular to the optical axes in the optical axis direction in which the video light beam 12 is entered and emitted, color separation can be prevented in the full range of the video light beam 12 emitted from the video-light-beam coupling unit 15. When the video-light-beam coupling unit 15 is in a columnar shape having a cross section in an isosceles triangle, production is easy, and thus production costs can be suppressed. For a reflection surface 15b of the video-light-beam coupling unit 15, total reflection may be used. In the case in which the video light beam 12 that is transmitted through the inside is entered at an angle smaller than the critical angle to the normal of the reflection surface, mirror coating may be applied in order to prevent losses due to leakage.

With the use of mirror coating, the restriction of the critical angle determined by the refractive index of the video-light-beam coupling unit 15 is not imposed, and the degree of freedom of design of the retaining unit 19 is advantageously improved. An angle θp at which the video light beam 12 is reflected in internal reflection and the optical axis is deflected determines the mounting angles of the illumination unit 13, the projection unit 14, and the light guide unit 11. When the deflection angle is set to θp, the vertical angle of a prism that constitutes the video-light-beam coupling unit 15 only has to be set to θp. In the case in which the retaining unit 19 is disposed along the forehead of a user 3, the deflection angle θp is increased, whereas in the case in which the retaining unit 19 is disposed along the side surface of the head, the deflection angle θp only has to be reduced. In the case in which an angle is provided between the head of the user 3, the normal direction of the light guide unit 11, and a visual line e, the deflection angle only has to be adjusted for these angles.

For example, when the mounting angle of the normal of the light guide unit 11 between the projection unit 14 is 10°, a prism having a vertical angle of 80° can be used.

According to Example 5, the retaining unit 19 can be disposed along the head while the light guide unit 11 is disposed in front of the eye of the user 3, and thus a virtual image projection device that is easily mounted on the user 3 can be provided.

As described above, the examples of the present invention are described. However, the present invention is not limited to the foregoing examples, and includes various modifications. For example, the foregoing examples are described in detail for easy understanding of the present invention. The present invention is not necessarily limited to ones including all the configurations. A part of the configuration of an example can be replaced by the configuration of another example, and the configuration of another example can be added to the configuration of an example. To a part of the configurations of the examples, another configuration can be added, removed, and replaced.

In the examples, the binocular head mounted display (HMD) is taken and described. However, any virtual image projection device that displays virtual images is included in the scope of the present invention, not limited to the HMD.

REFERENCE SIGNS LIST

1 . . . HMD,
3 . . . user,
10 . . . video display unit,
11 . . . light guide unit,
12 . . . video light beam,
13 . . . illumination unit,
14 . . . projection unit,
15 . . . video-light-beam coupling unit,
19 . . . retaining unit,
110 . . . light source unit,
114 . . . condenser lens,
115 . . . color synthesizing unit,
116 . . . multi-lens array,
117 . . . image forming lens,
118 . . . prism-equipped image forming lens,
119 . . . reflection unit,
120 . . . display,
130 . . . virtual image projector,
1140 . . . optical axis

The invention claimed is:

1. A virtual image projection device that shows video to a human eye, comprising:
   a virtual light source surface configured to emit a light beam in a predetermined angular distribution;
   an image forming lens configured to condense a light beam from the virtual light source surface; and
   a display configured to create video,
   wherein when the virtual light source surface is disposed at a nearly focal position on a front side of the image forming lens, and the display is disposed at a nearly focal position on a rear side of the image forming lens,
   wherein a size of the virtual light source surface is smaller than a diameter of the image forming lens, and
   wherein an F value of the image forming lens that captures a light beam which is entered to the display is matched with an F value at which a light beam emitted from the virtual light source surface is captured.

2. The virtual image projection device according to claim 1,
wherein a video display region of the display is a rectangle, and the virtual light source surface is in a nearly square.

3. The virtual image projection device according to claim 2, comprising a virtual image projector configured to transmit video created at the display to a human eye,
wherein an F value of the virtual image projector that captures a light beam emitted from the display is matched with the F value of the image forming lens that captures a light beam emitted from the virtual light source surface.

4. The virtual image projection device according to claim 3, comprising:
a light source configured to emit a light beam; and
a condenser lens configured to convert a light beam emitted from the light source in nearly parallel,
wherein the virtual light source surface has a function that converts an angle of the light beam emitted from the condenser lens by diffusion or by a lens array.

5. The virtual image projection device according to claim 4,
wherein the F value of the condenser lens that captures the light beam emitted from the light source is matched with the F value of the virtual image projector.

6. The virtual image projection device according to claim 1,
wherein the image forming lens is a prism-equipped image forming lens that has a reflection surface configured to deflect a light beam using internal reflection; and
a light beam emitted from the virtual light source surface is reflected off the reflection surface of the image forming lens and then the light beam is entered to the display.

7. The virtual image projection device according to claim 6,
wherein the image forming lens includes an incident surface to which a light beam emitted from the virtual light source surface is entered and a light-emitting surface from which a light beam is emitted to the display; and
an angle formed by the incident surface and the light-emitting surface of the image forming lens is smaller than 90 degrees.

8. The virtual image projection device according to claim 7,
wherein the image forming lens is integrally molded using a transparent material.

9. The virtual image projection device according to claim 6,
wherein the image forming lens includes an incident surface to which a light beam emitted from the virtual light source surface is entered and a light-emitting surface from which a light beam is emitted to the display; and
an aspherical lens is provided on the light-emitting surface.

10. The virtual image projection device according to claim 6,
wherein a video display region of the display is a rectangle; and
the reflection surface of the image forming lens has a function that deflects a light beam in a short direction of the video display region.

11. The virtual image projection device according to claim 10,
wherein the short direction of the video display region is in parallel with a plane including an optical axis before and after reflection of the reflection surface of the image forming lens.

12. The virtual image projection device according to claim 1, comprising:
a projection unit configured to project an image created at the display as a video light beam;
a video-light-beam coupling unit that is a prism configured to couple a video light beam projected from the projection unit; and
a light guide unit configured to guide a video light beam emitted from the video-light-beam coupling unit to an eye of a user,
wherein a normal of an incident surface of the light guide unit and an optical axis of the projection unit are inclined, and a vertical angle of the video-light-beam coupling unit is matched with a tilt angle.

* * * * *